US007805737B2

(12) United States Patent  
Yamada et al.

(10) Patent No.: US 7,805,737 B2  
(45) Date of Patent: Sep. 28, 2010

(54) DISK DRIVE DEVICE AND ELECTRONIC APPARATUS

(75) Inventors: Takashi Yamada, Tokyo (JP); Hideaki Kumagai, Kanagawa (JP); Kazuyuki Yamamoto, Kanagawa (JP); Toshio Mamiya, Tokyo (JP)

(73) Assignee: Sony Corporation, Tokyo (JP)

( * ) Notice: Subject to any disclaimer, the term of this patent is extended or adjusted under 35 U.S.C. 154(b) by 1198 days.

(21) Appl. No.: 11/406,899

(22) Filed: Apr. 18, 2006

(65) Prior Publication Data

US 2007/0101347 A1    May 3, 2007

(30) Foreign Application Priority Data

Apr. 19, 2005  (JP)  ............................. 2005-121728

(51) Int. Cl.
*G11B 17/04* (2006.01)
(52) U.S. Cl. ...................................... 720/622
(58) Field of Classification Search ................. 720/622, 720/689
See application file for complete search history.

(56) References Cited

U.S. PATENT DOCUMENTS

2003/0103434 A1 * 6/2003 Kuo ........................... 369/77.1

2006/0250715 A1  11/2006  Yamamoto et al.

FOREIGN PATENT DOCUMENTS

| JP | 59-005024 U | 1/1984 |
| JP | 08-017057 A | 1/1996 |
| JP | 08-161807 A | 6/1996 |
| JP | 2005-085447 A | 3/2005 |
| JP | 2006-228352 A | 8/2006 |
| JP | 2002-352498 A | 12/2006 |

* cited by examiner

*Primary Examiner*—David D Davis
(74) *Attorney, Agent, or Firm*—Wolf, Greenfield & Sacks, P.C.

(57) ABSTRACT

A disk drive device includes a housing having a front side with a slot through which a disk-shaped recording medium is inserted and ejected, a pickup unit including a mount on which the recording medium is mounted, a rotating mechanism that rotates the recording medium on the mount, a pickup mechanism that reproduces a signal recorded on the recording medium, a pickup-moving mechanism that moves the pickup mechanism in a radial direction of the recording medium, and a base plate that has a protruding surface guiding the recording medium toward the mount and on which the mount, the rotating mechanism, the pickup mechanism, and the pickup-moving mechanism are integrated, and a conveying mechanism that conveys the recording medium between the slot and the mount.

12 Claims, 36 Drawing Sheets

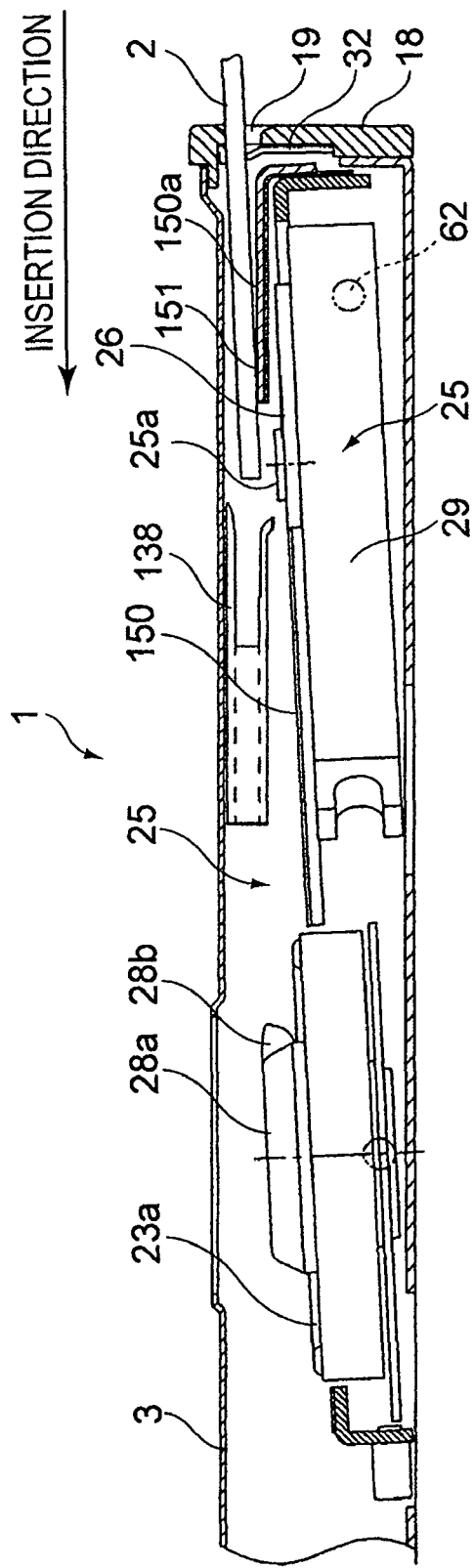
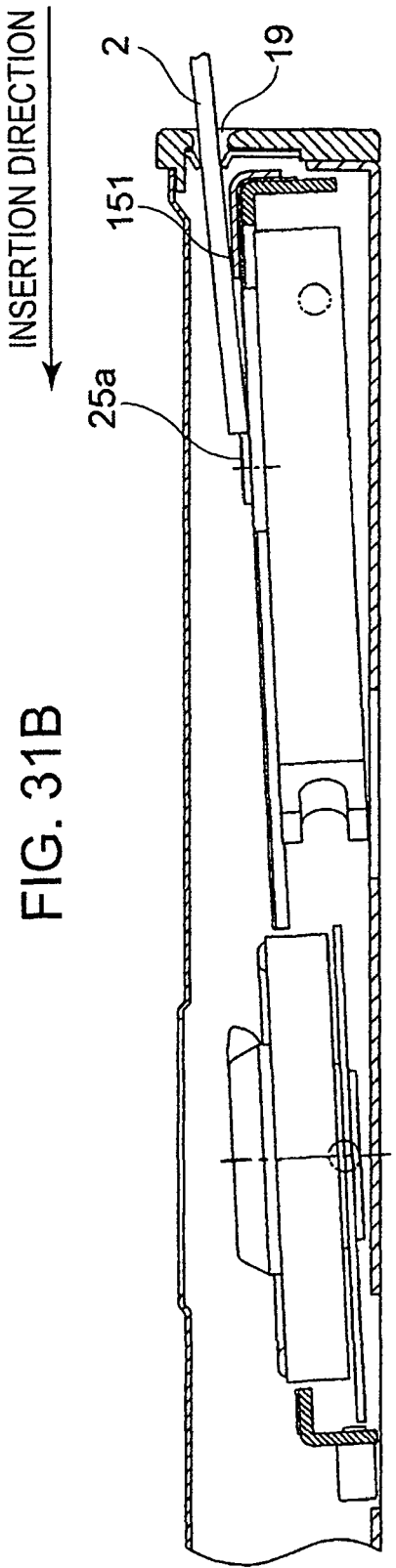

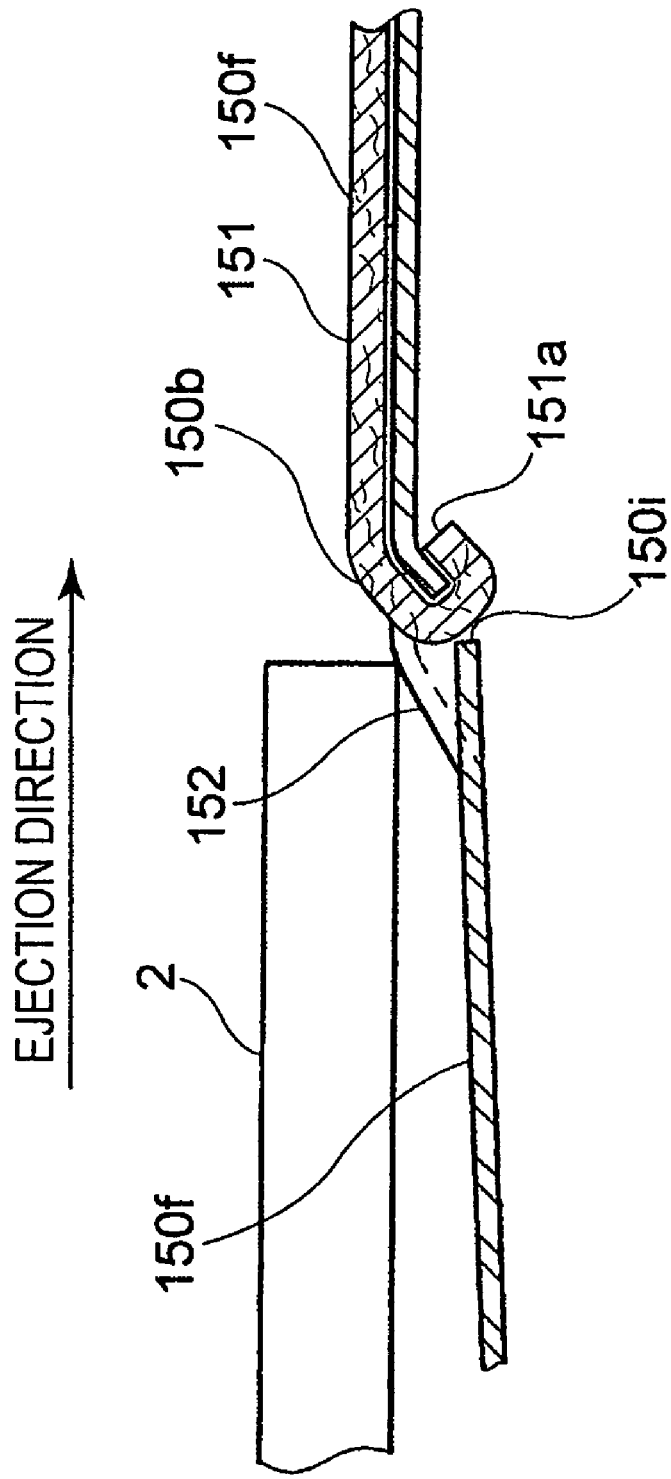

DISK DRIVE DEVICE AND ELECTRONIC APPARATUS

CROSS REFERENCES TO RELATED APPLICATIONS

The present invention contains subject matter related to Japanese Patent Application JP 2005-121728 filed in the Japanese Patent Office on Apr. 19, 2005, the entire contents of which are incorporated herein by reference.

BACKGROUND OF THE INVENTION

1. Field of the Invention

The present invention relates to disk drive devices for recording and reproducing signals on disk-shaped recording media, such as optical disks, and electronic apparatuses. More particularly, the present invention relates to a slot-in disk drive device that can directly receive and eject a disk-shaped recording medium through a slot and an electronic apparatus including the disk drive device.

2. Description of the Related Art

In general, disk-shaped recording media including optical disks, such as compact disks (CD) and digital versatile disks (DVD), and magneto-optical (MO) disks, such as minidisks (MD), are commonly known and various kinds of disk drive devices compatible with these disks have been provided.

In one type of disk drive device, a lid or a door provided on a housing is opened so that a disk can be directly attached to a turntable that faces outside through the lid or the door. In another type of disk drive device, a disk is placed on a disk tray that is horizontally conveyed into or out of a device body and the disk is automatically mounted on a turntable disposed in the device body when the disk tray is pulled into the device body. In a still another type of disk drive, the turntable is formed integrally with the disk tray and a disk is directly mounted on the turntable when the disk tray is conveyed out of the device body. However, in either type, a user performs an operation of opening/closing the lid or the door, moving the disk tray inward and outward, or mounting the disk on the turntable.

In comparison, a so-called slot-in disk drive device is known in which a disk is automatically pulled into a device body and mounted on a turntable when the disk is simply inserted through a slot that is provided in the front side of a housing. In this disk drive device, when a disk is inserted into the slot, a load operation of pulling the disk into the housing or an eject operation of ejecting the disk from the housing through the slot is performed by rotating a pair of guide rollers that face each other in the opposite directions while the disk is held between the guide rollers.

On the other hand, there are demands for smaller, thinner, and lighter mobile apparatuses, such as notebook personal computers, and AV apparatuses, such as DVD recorders, in which the disk drive devices are mounted. Accordingly, there are demands for smaller, thinner, and lighter disk drive devices for use in such a mobile apparatus and an AV apparatus. In addition, recently, there have been higher demands for slot-in disk drive devices that provide good operational feel than for tray-type disk drive devices that have been mainly used in personal computers and the like.

However, in a typical slot-in disk drive device, the length of the pair of guide rollers is longer than the disk diameter, and therefore the width of the overall device is relatively large. In addition, since the disk is held between the pair of guide rollers, the thickness of the device is also large. Therefore, it is considerably difficult to provide a small, thin slot-in disk drive device.

Accordingly, to satisfy the demands for small, thin slot-in disk drive devices, a slot-in disk drive device including a plurality of rotating arms disposed between a disk inserted through a slot and a base to which a turntable for receiving the disk is attached has been suggested in, for example, Japanese Unexamined Patent Application Publication No. 2002-117604 (see paragraph [0029] and FIG. 1). In this disk drive device, a load operation of pulling the disk into the housing through the slot and an eject operation of ejecting the disk from the housing through the slot are performed by rotating the rotating arms in a plane parallel to the disk.

SUMMARY OF THE INVENTION

However, the above-mentioned disk drive device according to Japanese Unexamined Patent Application Publication No. 2002-117604 can receive only disks with a diameter of 12 cm, which is the standard size. Therefore, when a disk with a size other than the standard size, for example, a small-diameter disk with a diameter of 8 cm like a single CD and a recording DVD used in a camcorder, is inserted through the slot, the small-diameter disk is ejected through the slot. In other words, it is difficult for the disk drive device described in Japanese Unexamined Patent Application Publication No. 2002-117604 to perform a centering operation for positioning a disk at a disk mounting position using the rotating arms for disks with different diameters.

In addition, in the slot-in disk drive device according to Japanese Unexamined Patent Application Publication No. 2002-117604, the user inserts the disk to a certain depth through the slot and pushes the rear peripheral portion of the disk in the disk insertion direction. Therefore, the disk may be inserted into the housing through the slot in an inclined (tilted) manner. In such a case, there is a risk that the disk surface will be damaged by coming into contact with components disposed in the housing. In addition, there is a disk that the disk will directly come into contact with an optical pickup (hereafter abbreviated as OP) mechanism disposed in the housing and damage an objective lens included in the OP.

In light of the above-described situation, it is desirable to provide a highly reliable disk drive device that can prevent a disk from colliding with an objective lens included in a pickup mechanism or with other components even when the disk is inserted through a slot in an inclined manner and an electronic apparatus including the disk drive apparatus.

According to an embodiment of the present invention, a disk drive device includes a housing having a front side that has a slot through which a disk-shaped recording medium is inserted and ejected, a pickup unit including a mount on which the recording medium inserted into the housing through the slot is mounted, a rotating mechanism that rotates the recording medium mounted on the mount, a pickup mechanism capable of reproducing a signal recorded on the recording medium rotated by the rotating mechanism, a pickup-moving mechanism that moves the pickup mechanism in a radial direction of the recording medium, and a base plate that has a protruding surface of guiding the recording medium toward the mount and on which the mount, the rotating mechanism, the pickup mechanism, and the pickup-moving mechanism are integrated, and a conveying mechanism that conveys the recording medium between the slot and the mount.

The disk-shaped recording medium may be an optical disk, such as a CD and a DVD, or a magneto-optical disk, such as an MD. The protruding surface is positioned outside the recording medium when the recording medium is mounted on the mount. A part of the pickup mechanism may be covered by the protruding surface when the pickup mechanism is moved to a position near the slot by the pickup-moving mechanism. In this case, the part of the pickup mechanism covered by the protruding surface includes, for example, a part of a surface of an actuator cover that supports an actuator disposed near the objecting lens in the pickup mechanism but does not include the objective lens. The conveying mechanism may include rotating arms that can rotate along a plane parallel to the inserted recording medium while holding the recording medium. Alternatively, the conveying mechanism may also include a pair of guide rollers that can rotate in the opposite directions while holding the recording medium between the guide rollers. The disk drive device may either be formed as a stand alone device or be included in electronic apparatuses such as personal computers (PC) and audio/visual (A/V) apparatuses.

According to the above-described structure, since the protruding surface is provided, the recording medium is guided to the mount even when the recording medium is inserted through the slot such that recording medium is inclined toward the lower front. Accordingly, the recording medium is prevented from being damaged by coming into contact with the components disposed in the housing. In addition, the objective lens included in the pickup mechanism is prevented from being damaged by coming into contact with the recording medium. In addition, the insertion angle of the recording medium is restricted by the protruding surface and the recording medium can be smoothly guided to the conveying mechanism in the standby state.

In the disk drive device according to the embodiment of the present invention, the protruding surface may be integrated on the base plate. In such a case, since the protruding surface and the base plate are integrated as a single component, the number of components does not increase even when the protruding surface is provided. Accordingly, the manufacturing process can be facilitated and the costs can be reduced. In addition, the weight of the disk drive device can be reduced.

In the disk drive device according to the embodiment of the present invention, the pickup unit may further include a sheet member that is adhered so as to cover the protruding surface and composed of fiber or leather. The sheet member is made of a material that has a low coefficient of friction and that does not easily damage the recording medium. For example, artificial leather obtained by impregnating unwoven fabric with urethane resin, synthetic fabric including synthetic leather obtained by impregnating woven fabric with resin, natural leather, etc., may be used as the material of the sheet member. Accordingly, the recording medium can be prevented from being damaged by the sheet member even when the recording member inserted through the slot comes into contact with the protruding surface.

In the disk drive device according to the embodiment of the present invention, the base plate may have a projection that guides the recording medium onto a surface of the sheet member when the recording medium is ejected. The projection may be integrated on the base plate or be formed separately from the base plate. Accordingly, in the ejection operation of the recording medium, a situation that the peripheral portion of the recording medium collides with (becomes caught by) the sheet member and the ejection of the recording medium is impeded can be avoided.

In the above-described disk drive device, the sheet member may have an end face that faces a direction in which the recording medium is inserted and the projection may be provided so as to cover the end face. In such a case, the projection may be formed so as to extend over the entire length of the boundary between the sheet member and an inclined surface so that the entire region of the end face of the sheet member is covered by the projection. Alternatively, a plurality of projections that partially cover the end face may be provided at predetermined intervals. Accordingly, the recording medium can be prevented from colliding with the end face of the sheet member when the recording medium is ejected and the recording medium can be reliably guided onto the surface of the sheet member.

In the above-described disk drive device, the base plate may have a slit at a position closer to the slot than the projection and the sheet member may extend through the slit and be folded onto a bottom surface of the base plate. In this case, since the end face is folded onto the bottom surface of the base plate, the recording medium does not collide with the end face of the sheet member when the recording medium is ejected. Accordingly, this structure and the above-described projection allow the recording medium to be more reliably guided onto the surface of the sheet member.

In the disk drive device according to the embodiment of the present invention, the protruding surface may have a drawn portion. In such a case, the strength of the protruding surface can be ensured and the protruding surface can be prevented from being bent or deformed when the recording medium comes into contact with the protruding surface. This structure is particularly effective when, for example, the protruding surface is formed on a thin metal plate to reduce the thickness of the disk drive device.

In the disk drive device according to the embodiment of the present invention, the protruding surface may be coated with resin. When, for example, the protruding surface is coated with resin, such as urethane, that does not easily damage the recording medium, the recording medium can be prevented from being damaged by coming into contact with the protruding surface in the insertion process even if the sheet member is not provided. In addition, not only the protruding surface but also the entire area of the base plate may be coated with resin.

The disk drive device according to the embodiment of the present invention may be capable of receiving a first disk and a second disk as the recording medium, the first disk having a first diameter and the second disk having a second diameter that is different from the first diameter. The first disk may be, for example, a large-diameter with a diameter of 12 cm used in commonly used CD players and DVD players, and the second disk may be a small-diameter disk with a diameter of 8 cm used in camcorders and the like. The first and second diameters may, of course, also be 8 cm and 12 cm, respectively. Accordingly, the recording medium and the objective lens included in the pickup mechanism may be prevented from being damaged in the disk drive device capable of receiving recording media with different diameters.

According to another embodiment of the present invention, an electronic apparatus includes a disk drive device and a control unit for controlling the operation of the disk drive device. The disk drive device includes a housing having a front side that has a slot through which a disk-shaped recording medium is inserted and ejected, a pickup unit including a mount on which the recording medium inserted into the housing through the slot is mounted, a rotating mechanism that rotates the recording medium mounted on the mount, a pickup mechanism capable of reproducing a signal recorded on the recording medium rotated by the rotating mechanism, a pickup-moving mechanism that moves the pickup mechanism in a radial direction of the recording medium, and a base plate that has a protruding surface guiding the recording medium toward the mount and on which the mount, the rotating mechanism, the pickup mechanism, and the pickup-moving mechanism are integrated, and a conveying mechanism that conveys the recording medium between the slot and the mount.

The electronic apparatuses may be computers including laptop and desktop personal computers, personal digital assistances (PDA), electronic dictionaries, cameras, display apparatuses, audio/visual apparatuses, mobile apparatuses, game apparatuses, car navigation apparatuses, robot apparatuses, and other various electric apparatuses. The control unit is, for example, a CPU that generates and transmits signals to at least the disk drive device on the basis of operation inputs from a user.

According to the present invention, a highly reliable disk drive device that can prevent a disk from colliding with an objective lens included in a pickup mechanism or with other components even when the disk is inserted through a slot in an inclined manner and an electronic apparatus including the disk drive apparatus.

BRIEF DESCRIPTION OF THE DRAWINGS

FIGS. 31A and 31B are sectional views illustrating the manners in which a disk is inserted though a slot in the disk drive device according to the embodiment of the present invention and a known disk drive device, respectively;

FIG. 36 is a diagram showing a projection according to a still another embodiment of the present invention.

DESCRIPTION OF THE PREFERRED EMBODIMENTS

Embodiments of the present invention will be described below with reference to the accompanying drawings.

Figure 1:
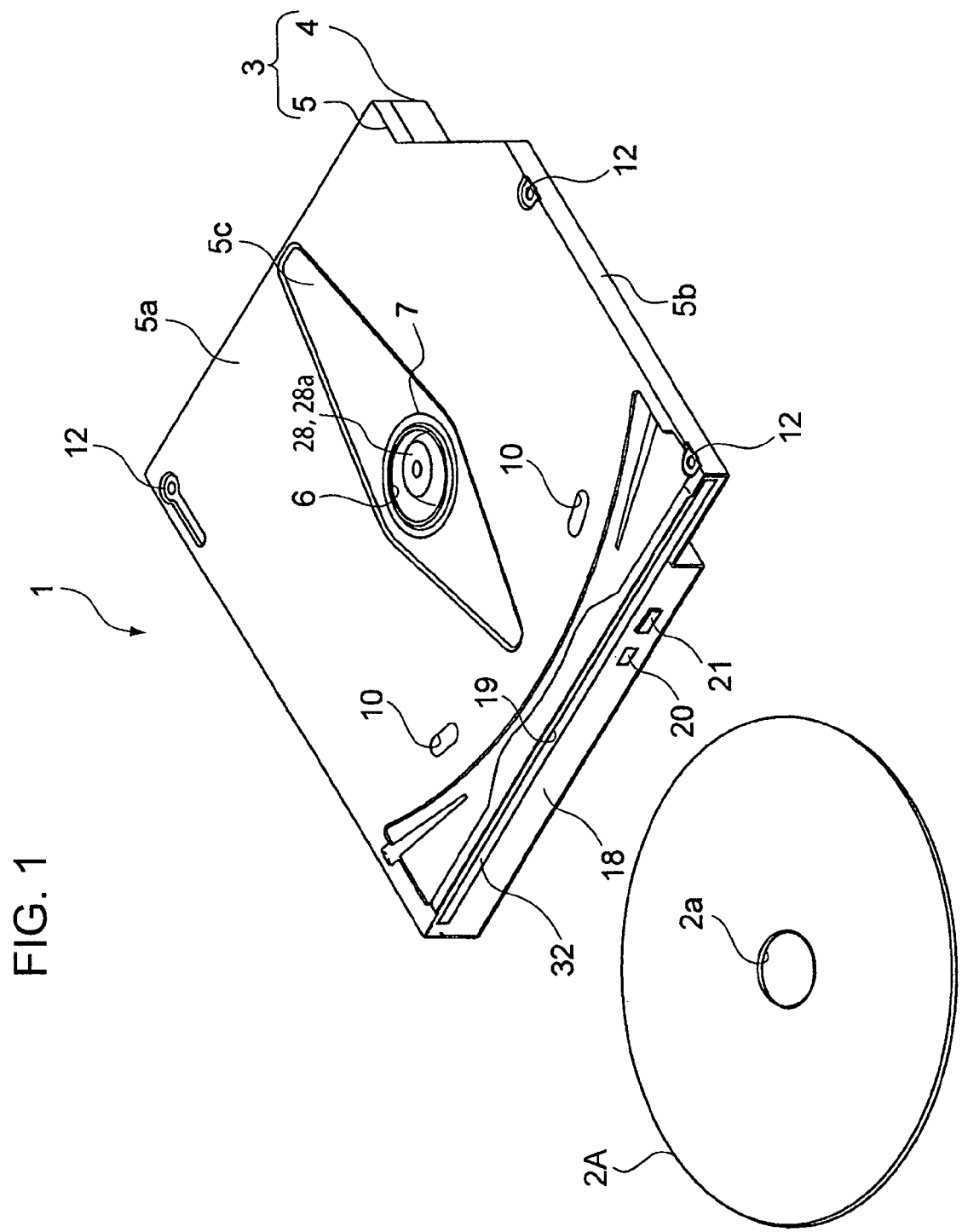
FIG. 1 is a perspective view illustrating a disk drive device according to an embodiment of the present invention.
Figure 2:
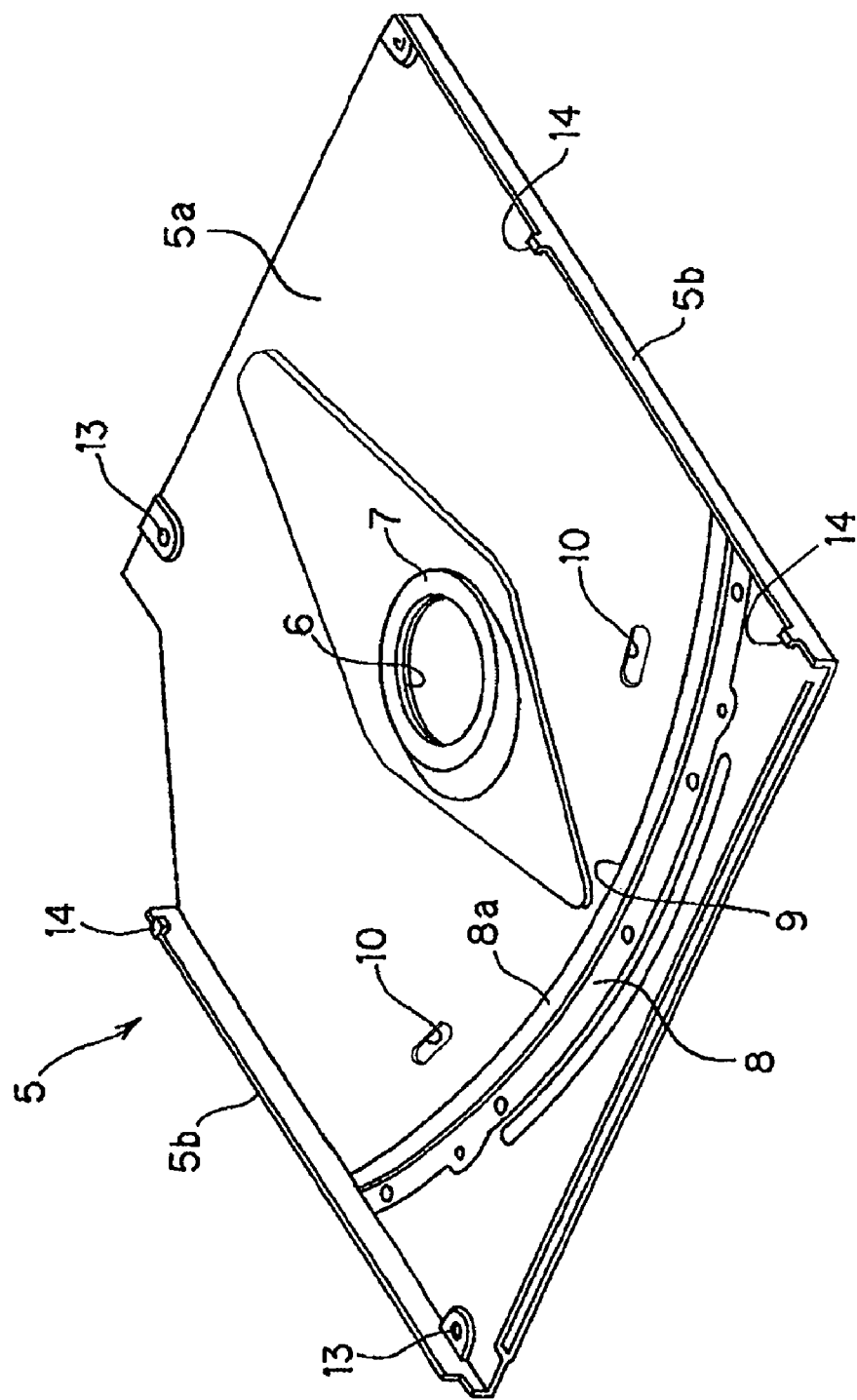
FIG. 2 is a perspective view illustrating a top cover of the disk drive device viewed from the inside.
Figure 3:
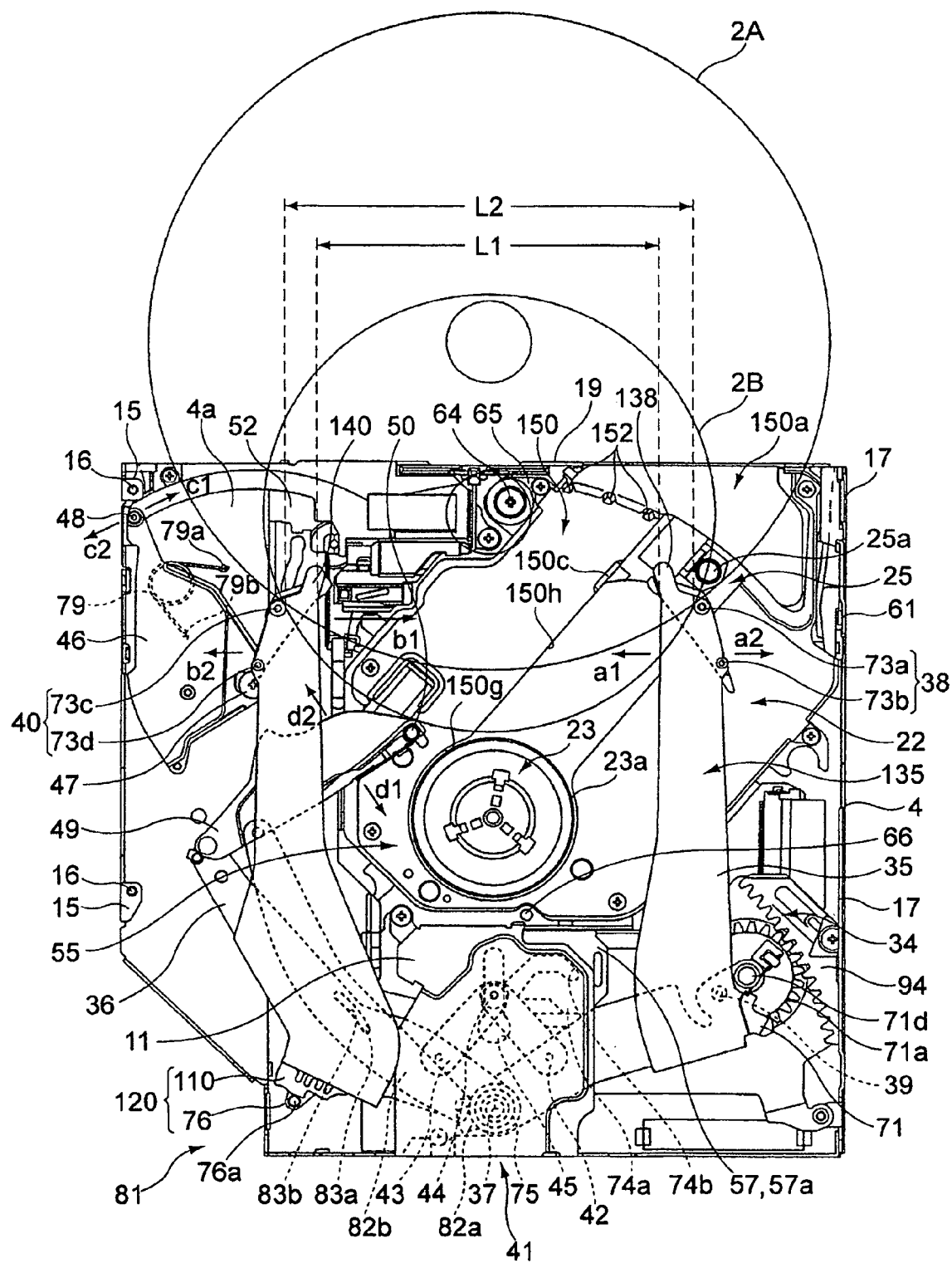
FIG. 3 is a plan view illustrating the inner structure of the disk drive device.

FIG. 1 is a perspective view illustrating a disk drive device 1 according to an embodiment of the present invention. FIG. 2 is a perspective view illustrating a top cover of the disk drive device 1 viewed from the inside. FIG. 3 is a plan view illustrating the inner structure of the disk drive device 1.

Referring to FIG. 1, the disk drive device 1 includes a housing 3 that functions as an outer shell. The housing 3 includes a substantially flat-box shaped bottom case 4 that functions as a lower housing section and a top cover 5 that covers an upper opening of the bottom case 4.

The disk drive device 1 can record and reproduce signals on a disk 2 which may either be a large-diameter disk 2A shown in FIG. 1 that has a diameter of 12 cm and a small-diameter disk shown in FIG. 3 that has a diameter of 8 cm.

As shown in FIGS. 1 and 2, the top cover 5 is formed of a thin metal plate and includes a top plate 5a that covers the upper opening of the bottom case 4 and a pair of side plates 5b formed by bending side portions of the top plate 5a along the opposite sides of the bottom case 4. The top plate 5a has a substantially circular hole 6 at substantially the center thereof. An engaging projection 28a of a turntable 23a that engages with a center hole 2a formed in the disk 2 is exposed to the outside through the hole 6 when a chucking operation, which will be described below, is performed. In addition, the top plate 5a has a contact projection 7 that slightly projects toward the inside of the housing 3 along the periphery of the hole 6. The contact projection 7 comes into contact with a peripheral portion of the center hole 2a of the disk 2 when the disk 2 is placed on the turntable 23a.

As shown in FIG. 2, the top plate 5a has a guide member 8 on an inner principal surface thereof. The guide member 8 guides an end portion of a first rotating arm 35 and an end portion of a second rotating arm 36, which will be described below, toward and away from each other while restriction the vertical positions thereof. The guide member 8 is formed of a substantially arc-shaped metal plate that extends between the side plates 5b along the top plate 5a, and is attached to the inner surface of the top plate 5a by spot welding or caulking at a position near the front side. In addition, the guide member 8 has an attachment portion that is adjacent to the front side and a retaining portion 8a that is higher than the attachment portion and that is adjacent to the rear side. Accordingly, a guide groove 9 with which the end portion of the first rotating arm 35 and the end portion of the second rotating arm 36 are engaged is formed between the retaining portion 8a of the guide member 8 that is adjacent to the rear side and the top plate 5a. In addition, the top plate 5a has windows 10 for bringing the end portion of the first rotating arm 35 and the end portion of the second rotating arm 36 into engagement with the guide groove 9.

In addition, a diamond-shaped drawn portion 5c is provided at substantially the center of the principal surface of the top plate 5a. The drawn portion 5c is formed by being drawn toward the bottom surface of the housing 3 in an area where the first rotating arm 35 and the second rotating arm 36 are not disposed or rotated in the housing 3. The drawn portion 5c serve to increase the strength of the top plate 5a, to restrict the inclination of the disk 2 inserted through the slot 19, and to press the disk 2 from above in the chucking operation so that the chucking operation can be smoothly performed.

As shown in FIG. 3, the bottom case 4 is formed of an approximately flat-box shaped metal plate. The bottom case 4 has a substantially rectangular bottom plate and a wing portion 4a that extends outward at a position higher than the bottom plate on one side of the bottom case 4.

A circuit board on which electronic components, such as an IC chip, that form a drive control circuit (not shown) for controlling the operation of the disk drive device 1, a connector for providing electrical connections, and detection switches, which will be described below, for detecting various movements are arranged is attached to the bottom plate of the bottom case 4 with screws or the like. In addition, a chassis 11 is attached to the bottom plate of the bottom case 4 with screws. The chassis 11 is positioned above the circuit board so as to divide the inside of the bottom case 4 at substantially the same height as the height of the above-mentioned wing portion 4a.

As shown in FIG. 1, the top cover 5 is attached to the bottom case 4 with screws 12. More specifically, as shown in FIG. 2, a plurality of through holes 13 for receiving the screws 12 shown in FIG. 1 are formed along the peripheral edge section of the top plate 5a. In addition, the side plates 5b have a plurality of guide tabs 14 that are bent inward at a substantially right angle. As shown in FIG. 3, the bottom case 4 has fixing tabs 15 that are bent inward at a substantially right angle on the peripheral edge thereof. The fixing tabs 15 have screw holes 16 that correspond to the through holes 13 formed in the top cover 5. In addition, a plurality of guide slits 17 for retaining the guide tabs 14 of the top cover 5 are formed in the opposite sides of the bottom case 4.

When the top cover 5 is attached to the bottom case 4, the top cover 5 is caused to slide in the front to rear direction while the guide tabs 14 on the top cover 5 are engaged with the guide slits 17 formed in the bottom case 4. Thus, the upper opening of the bottom case 4 is covered by the top plate 5a of the top cover 5. Then, the screws 12 are inserted through the through holes 13 in the top cover 5 and are attached to the screw holes 16 in the bottom case 4. Thus, the housing 3 shown in FIG. 1 is obtained.

After the assembly, label seals (not shown) are adhered the top plate 5a of the top cover 5 to block the above-mentioned hole 6 and the windows 10. Accordingly, dust can be prevented from entering the housing 3 and a laser leakage to the outside can be avoided.

As shown in FIG. 1, a substantially rectangular plate-shaped front panel 18 is attached at the front side of the housing 3. The front panel 18 has a slot 19 through which the disk 2 is horizontally inserted and ejected. Accordingly, the disk 2 can be inserted into the housing 3 through the slot 19 or be ejected from the housing 3 through the slot 19. In addition, the front panel 18 has a display element 20 that illuminates to indicate the state of access to the disk 2, an eject button 21 that is pressed when the disk 2 is to be ejected, and a curtain 32 that prevents dust from entering and holds the disk 2 with a frictional force when the disk 2 is ejected.

Figure 4:
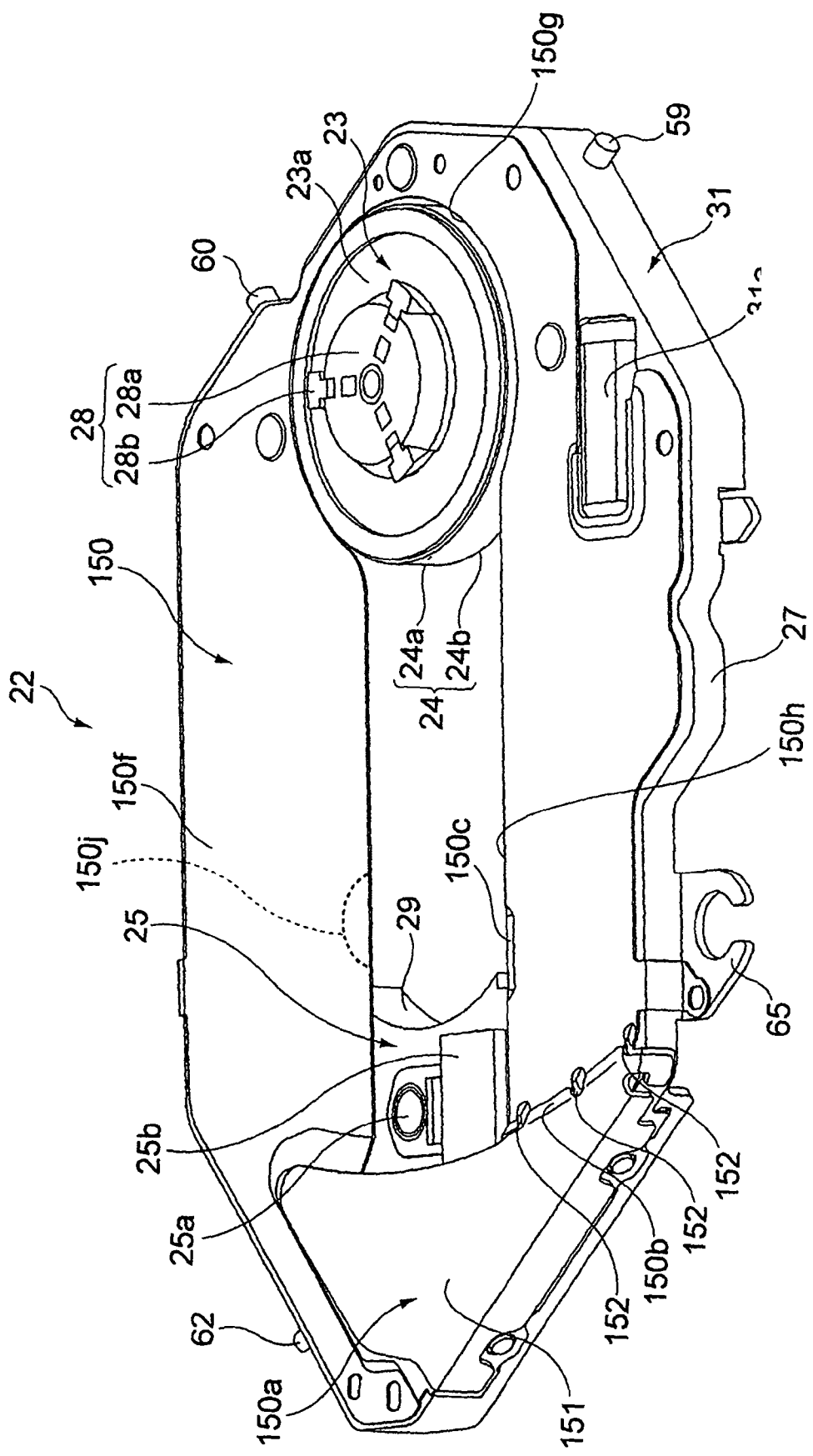
FIG. 4 is a perspective view illustrating a pickup unit of the disk drive device.
Figure 5:
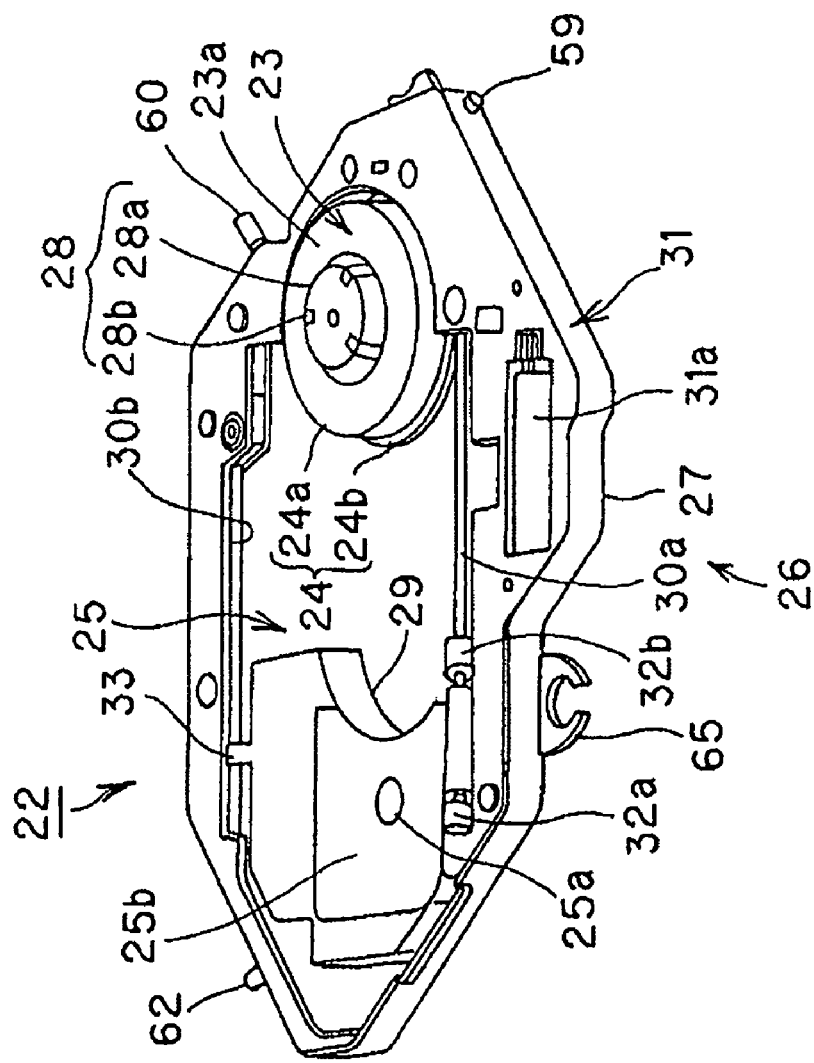
FIG. 5 is a perspective view illustrating the pickup unit from which a cover plate is removed.
Figure 6:
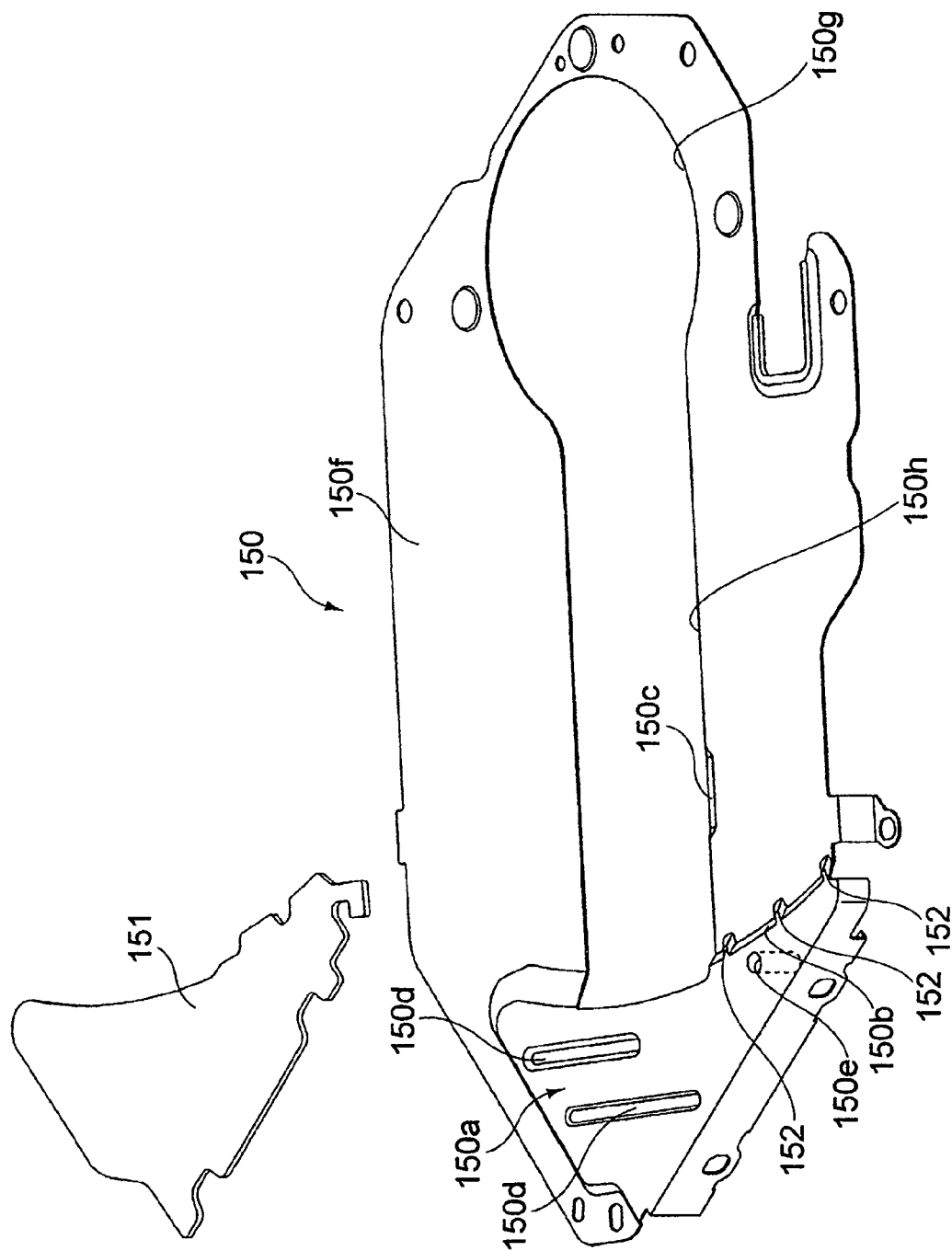
FIG. 6 is an exploded perspective view of the cover plate.

FIG. 4 is a perspective view illustrating a pickup unit 22 included in the disk drive device 1. FIG. 5 is a perspective view illustrating the pickup unit 22 from which a cover plate 150 is removed. FIG. 6 is an exploded perspective view of the cover plate 150.

As shown in FIGS. 3 to 5, the disk drive device 1 has a pickup unit 22 that forms a main body of the disk drive device 1 on the bottom plate of the bottom case 4.

The pickup unit 22 includes a disk mount 23 on which the disk 2 inserted into the housing 3 through the slot 19 is mounted; a disk-rotating mechanism 24 for rotating the disk 2 mounted on the disk mount 23; a pickup mechanism 25 for writing or reading signals on the disk 2 rotated by the disk-rotating mechanism 24; and a pickup-moving mechanism 26 for conveying the pickup mechanism 25 in the radial direction of the disk 2. The pickup unit 22 has an ultra-slim structure in which the above-mentioned components are integrated on a base plate 27.

The pickup unit 22 is arranged on the bottom plate of the bottom case 4 at a position closer to the front side than the chassis 11 such that the disk mount 23 is placed at substantially the center of the bottom case 4. In addition, the pickup unit 22 can be moved vertically by a base-lifting mechanism 55, which will be described below, and is positioned lower than the disk 2 inserted into the housing 3 through the slot 19 in the initial state.

As shown in FIG. 6, the base plate 27 is formed by punching out a metal plate in a predetermined shape and bending the peripheral portion thereof downward. The base plate 27 is covered by the cover plate 150 from above. A substantially semicircular table opening 150g through which the turntable 23a of the disk mount 23 faces upward and a substantially rectangular pickup opening 150h which continues from the table opening 150g and through which an objective lens 25a included in the pickup mechanism 25 faces upward is formed in the principal surface of the cover plate 150.

Figures 11A, 11B:
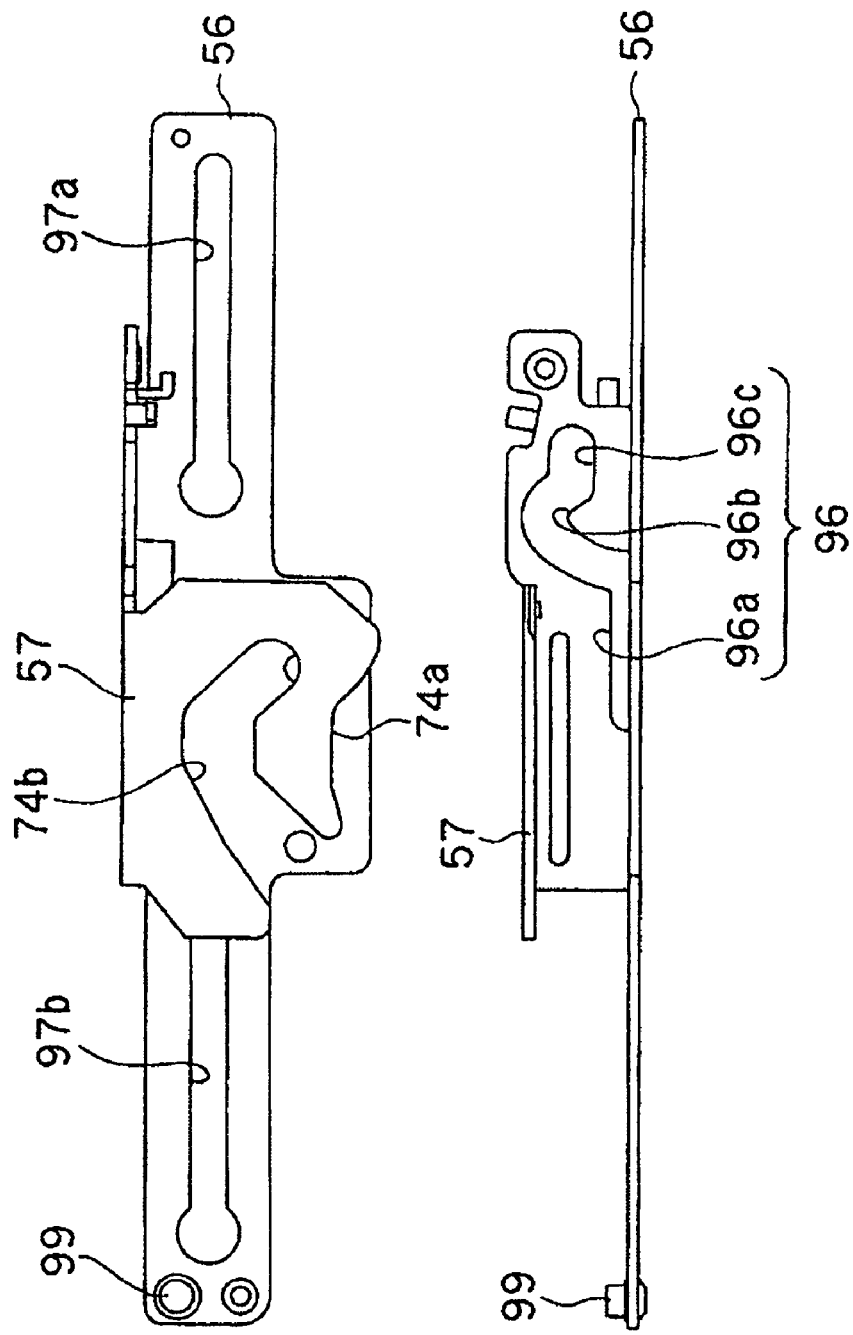
FIG. 11A is a plan view illustrating the structure of a cam lever and FIG. 11B is a side view illustrating the structure of the cam lever.

As shown in FIGS. 4 and 5, the base plate 27 includes a first support shaft 59 that projects on a side that faces a drive lever 52, which will be described below, at a position near the disk mount 23; a second support shaft 60 that projects on a side that faces a cam lever 56 shown in FIGS. 11A and 11B, which will be described below, at a position near the disk mount 23; a third support shaft 62 that projects on a side opposite to the side that faces the drive lever 52 at a position near the front side; and a fixing support portion 65 provided on a side opposite to the side surface that faces the cam lever 56 at a position near the front side.

The disk mount 23 has the turntable 23a that is rotated by the disk-rotating mechanism 24, and a chucking mechanism 28 for attaching the disk 2 to the turntable 23a is provided at the center of the turntable 23a. The chucking mechanism 28 includes an engaging projection 28a that engages with the center hole 2a of the disk 2 and a plurality of retaining lugs 28b for retaining the disk 2 at the periphery of the center hole 2a that engages with the engaging projection 28a. Thus, the chucking mechanism 28 retains the disk 2 on the turntable 23a.

The disk-rotating mechanism 24 has a flat spindle motor 24a that causes the disk 2 to rotate together with the turntable 23a. The spindle motor 24a is attached to the bottom plate of the cover plate 150 by means of screws with a supporting plate 24b disposed therebetween in such a manner that the turntable 23a placed on the spindle motor 24a slightly projects from the table opening 150g formed in the base plate 27.

The pickup mechanism 25 has an optical block that converges a light beam emitted from a semiconductor laser (not shown) that functions as a light source with an objective lens 25a, irradiates a signal recording surface of the disk 2 with the converged light beam so that the light beam is reflected by the signal recording surface, and receives the thus reflected light with a photodetector including a light-receiving element or the like. Thus, the pickup mechanism 25 writes or reads signals on the disk 2.

The pickup mechanism 25 includes an objective-lens drive mechanism, such as a two-axis actuator for moving the objective lens 25a in the optical axis direction (focusing direction) and a direction perpendicular to recording tracks of the disk 2 (tracking direction). The pickup mechanism 25 performs drive control operations including a focus servo operation for positioning the focal point of the objective lens 25a on the signal-recording surface of the disk 2 and a tracking servo operation for causing the spot of the light beam converged by the objective lens 25a to trace the recording track by moving the objective lens 25a in the focusing direction and the tracking direction by the two-axis actuator on the basis of a detection signal obtained from the disk 2. The actuator is supported on an actuator cover 25b. The objective-lens drive mechanism may also include a three-axis actuator that not only performs the focusing control and the tracking control but also adjusts the inclination (skew) of the objective lens 25a with respect to the signal-recording surface of the disk 2 so that the light beam converged by the objective lens 25a can be incident on the signal-recording surface of the disk 2 at a right angle.

As shown in FIG. 5, the pickup-moving mechanism 26 includes a pickup base 29 on which the pickup mechanism 25 is mounted, a pair of guide shafts 30a and 30b that support the pickup base 29 such that the pick base 29 can slide in the radial direction of the disk 2, and a pickup-base drive mechanism 31 that moves the pickup base 29 supported by the guide shafts 30a and 30b in the radial direction of the disk 2.

The pickup base 29 includes a pair of guide tabs 32a and 32b having guide holes through which the guide shaft 30a extends and a guide tab 33 having a guide groove in which the guide shaft 30b is fitted. The guide tab 33 and the guide tabs 32a and 32b project from opposite sides of the pickup base 29. Thus, the pickup base 29 is slidably supported by the pair of guide shafts 30a and 30b.

The guide shafts 30a and 30b are arranged parallel to the radial direction of the disk 2 on the bottom plate of the base plate 27 and guide the pickup base 29 from the inner periphery of the disk 2 to the outer periphery thereof while the pickup base 29 supports the pickup mechanism 25 that faces outside through the pickup opening 150h formed in the cover plate 150.

The pickup-base drive mechanism 31 includes a drive motor 31a that is attached to the base plate 27 and converts the rotation of the drive motor 31a into a linear movement using a gear and a rack (not shown), thereby moving the pickup base 29 along the guide shafts 30a and 30b, that is, in the radial direction of the disk 2.

Next, the cover plate 150 will be described in detail below. As shown in FIGS. 4 and 6, the cover plate 150 has a protruding surface 150a on the side adjacent to the slot 19, the protruding surface 150a substantially perpendicularly protruding from a cover plate surface 150f. The protruding surface 150a is formed integrally on the cover plate 150 such that the protruding surface 150a is placed outside the large-diameter disk 2A with a diameter of 12 cm when the large-diameter disk 2A is mounted on the disk mount 23. In addition, the protruding surface 150a is formed so as to cover the actuator cover 25b of the pickup mechanism 25 from above when the pickup mechanism 25 is moved to the outer periphery of the large-diameter disk 2A that is, to a position adjacent to the slot 19, by the pickup-moving mechanism 26. In general, the pickup mechanism 25 is preferably positioned near the slot 19 when the disk 2 is inserted. Accordingly, in the known structure, there is a risk that the disk 2 will collide with the objective lens 25a if the disk 2 is inserted in an inclined manner. However, in the present embodiment, since the protruding surface 150a covers the area near the objective lens 25a, the disk 2 is prevented from colliding with the objective lens 25a even when the disk 2 is inserted into the slot 19 in an inclined manner. In addition, since the protruding surface 150a is provided, the inserted disk 2 can be smoothly guided to flanges 138 and 140 of the first and second rotating arms 35 and 36, which will be described below.

A sheet member 151 is adhered to the protruding surface 150a and an inclined surface 150b provided between the protruding surface 150a and the surface 150f of the cover plate 150 with an adhesive or the like. The sheet member 151 is made of a material like an artificial leather that has a low coefficient of friction and that does not easily damage the recording surface of the disk 2. Accordingly, even when the disk 2 comes into contact with the protruding surface 150a when the disk 2 is inserted, the recording surface of the disk 2 is prevented from being damaged. As shown in FIG. 6, the sheet member 151 has a shape corresponding to the protruding surface 150a and the inclined surface 150b positioned between the protruding surface 150a and the cover plate surface 150f so as to extend over the protruding surface 150a and the inclined surface 150b, and is bent at a portion corresponding to the inclined surface 150b.

In addition, a plurality of (for example, three) small projections 152 are provided in a region between the cover plate surface 150f and the inclined surface 150b so as to cover the end face of the sheet member 151 that faces the disk insertion direction. The projections 152 are provided to avoid a situation that the peripheral portion of the disk 2 is caught by the end face of the sheet member 151 and it becomes difficult to eject the disk 2. The projections 152 will be described in more detail below.

In addition, a recess 150c that inclines toward the pickup opening 150h is formed along the boundary between the cover plate surface 150f and the pickup opening 150h at a position near the projections 152. Referring to FIG. 3, the recess 150c is provided to allow the rotating arm 35 to smoothly move from the pickup opening 150h onto the cover plate surface 150f without going under the cover plate 150 when the small-diameter disk 2B with a diameter of 8 cm is inserted and the first and the second rotating arms 35 and 36 are rotated inward while holding the small-diameter disk 2B.

In addition, as shown in the exploded perspective view of FIG. 6, a plurality of (for example, two) groove-shaped drawn portions 150d are formed in the protruding surface 150a of the cover plate 150 at a position below the sheet member 151. The drawn portions 150d ensure the strength of the protruding surface 150a so that the protruding surface 150a can be prevented from being bent even when the disk 2 is inserted through the slot 19 in an inclined manner and comes into contact with the protruding surface 150a. In addition, the protruding surface 150a has a deep drawn portion 150e that extends to the bottom surface of the bottom case 4 in addition to the drawn portions 150d. Accordingly, the protruding surface 150a can be prevented from being deformed even if a large load is applied when the disk 2 is inserted.

A cutout 150j having a predetermine shape may also be formed in the cover plate 150 so that the rotating arm 35 can be prevented from interfering with the cover plate 150 on the pickup unit 22 when the pickup unit 22 is moved upward by a base-lifting mechanism 55, which will be described below.

Next, a disk-conveying mechanism 34 will be described. Referring to FIG. 3, the disk drive device 1 includes the disk-conveying mechanism 34 that conveys the disk 2 between a disk insertion/ejection position to which the disk 2 is inserted or ejected through the slot 19 and a disk mounting position at which the disk 2 is mounted on the turntable 23a of the disk mount 23.

The disk-conveying mechanism 34 includes an arm mechanism 135 that extends and retracts along a plane substantially parallel to the recording surface of the disk 2 to convey the disk 2 between the slot 19 and the disk mount 23 while holding the peripheral portion of the disk 2 and a restricting mechanism 120 that restricts the movement of the arm mechanism 135 as described below.

The arm mechanism 135 includes the first rotating arm 35 and the second rotating arm 36 that rotate so as to hold the disk 2 therebetween at the peripheral portion of the disk 2, a third rotating arm 46 that assists the insertion of the disk 2, and a fourth rotating arm 49 that assists the ejection of the disk 2.

The first rotating arm 35 and the second rotating arm 36 are made of long metal plates and are disposed on the left and right sides of the disk mount 23. Each of the first rotating arm 35 and the second rotating arm 36 has a base portion positioned closer to the rear side than the disk mount 23 and supported by a first support shaft 37 provided on the chassis 11 and an end portion positioned closer to the front side than the disk mount 23. The first rotating arm 35 and the second rotating arm 36 can rotate in the directions shown by the arrows a1, a2, b1, and b2 in FIG. 3 such that the end portions thereof move toward or away from each other along a plane substantially parallel to the recording surface of the disk 2 inserted through the slot 19.

In the initial state (HOME state) in which the disk 2 is not yet inserted into the slot 19, the first rotating arm 35 and the second rotating arm 36 are positioned such that the end portions thereof are separated from each other by a predetermined angle.

As shown in FIG. 3, the first front contact member 38 and the flange 138 that restricts the movement of the disk 2 in the height direction thereof are provided on the end portion of the first rotating arm 35 that is adjacent to the front side of the bottom case 4, that is, to the front panel 18. The first front contact member 38 has a pair of rotating rollers 73a and 73b arranged in the front-rear direction.

The angle between the end portions of the first rotating arm 35 and the second rotating arm 36 is set such that at least the distance L1 between flanges 138 and 140 is smaller than the diameter of the small-diameter disk 2B, i.e., 8 cm, so that the small-diameter disk 2B can be retained when the small-diameter disk 2B is inserted into the slot 19. Preferably, the angle between the end portions is set such that the minimum distance L2 between a rotating roller 73a of a first front contact member 38 and a rotating roller 73c of a second front contact member 40 is smaller than the diameter of the small-diameter disk 2B.

The first rotating arm 35 also has a first rear contact member 39 at a position near the base portion of the first rotating arm 35 that is adjacent to the rear side of the bottom case 4. The first rear contact member 39 projects downward and comes into contact with the outer peripheral portion of the disk 2 together with the first front contact member 38 when the disk 2 is positioned at the disk mounting position.

The first front contact member 38, the flange 138, and the first rear contact member 39 are made of resin that is softer than the disk 2.

As shown in FIG. 3, a torsion coil spring 71d is attached to the first rotating arm 35. The first rotating arm 35 and the second rotating arm 36 are urged toward each other by the torsion coil spring 71d due to a gear portion 71a of a rotating member 71 and an inner gear 94. As shown in FIG. 3, the rotating member 71 has the gear portion 71a that extends over a predetermined section along the periphery of the rotating member 71, and the gear portion 71a meshes with the inner gear 94 disposed on the chassis 11. Accordingly, the rotating member 71 rotates in association with the rotation of the first rotating arm 35.

The second front contact member 40 that comes into contact with the outer peripheral portion of the disk 2 inserted through the slot 19 and the flange 140 that restricts the movement of the disk 2 in the height direction thereof are provided on the end portion of the second rotating arm 36. The second front contact member 40 has rotating rollers 73c and 73d. The second front contact member 40 and the flange 140 are also made of resin that is softer than the disk 2.

The first rotating arm 35 and the second rotating arm 36 are disposed at asymmetric positions with respect to the turntable 23a of the disk mount 23, and the rotational centers of the first rotating arm 35 and the second rotating arm 36 are on the same point that is closer to the rear side than the disk mount 23 in a substantially central section. In addition, the end portions of the first rotating arm 35 and the second rotating arm 36 are slidably supported while being engaged with the guide groove 9 formed in the top plate 5a.

The first rotating arm 35 and the second rotating arm 36 are rotated in the opposite directions by a link mechanism 41.

More specifically, the link mechanism 41 includes a first link arm 42 and a second link arm 43 that connect the first rotating arm 35 and the second rotating arm 36 to each other. The first link arm 42 and the second link arm 43 are made of long metal plates, and are connected to the base portion of the first rotating arm 35 and the base portion of the second rotating arm 36, respectively, at one longitudinal end thereof. In addition, the first link arm 42 and the second link arm 43 are connected to each other by a second support shaft 44 at the other longitudinal end, and accordingly a so-called pantograph structure is provided. The second support shaft 44 is engaged with a guide slit 45 that is positioned closer to the front side than the first support shaft 37 on the chassis 11 and that extends linearly in the insertion direction of the disk 2.

The first support shaft 37 has a first torsion coil spring 75 that urges the first rotating arm 35 and the second rotating arm 36 toward each other. The first torsion coil spring 75 is attached to the base portion of the first rotating arm 35 at one end and to the base portion of the second rotating arm 36 at the other end while the first support shaft 37 extends through the winding portion of the first torsion coil spring 75.

Accordingly, when the second support shaft 44 slides along the guide slit 45, the first rotating arm 35 and the second rotating arm 36 are rotated by the first link arm 42 and the second link arm 43 in the opposite directions. Thus, the link mechanism 41 can cause the end portion of the first rotating arm 35 and the end portion of the second rotating arm 36 to swing toward and away from each other.

The third rotating arm 46 rotates in a plane substantially parallel to the recording surface of the disk 2 inserted through the slot 19 in order to assist a load operation for pulling the disk 2 into the housing 3 through the slot 19. The third rotating arm 46 is made of a long metal plate and is placed on the left or right of the turntable 23a of the disk mount 23 (on the left in FIG. 3) at a position closer to the front side than the second rotating arm 36. The third rotating arm 46 is rotatably supported by a support shaft 47 provided on the wing portion 4a such that the third rotating arm 46 can rotate in the directions shown by the arrows c1 and c2.

Figure 7:
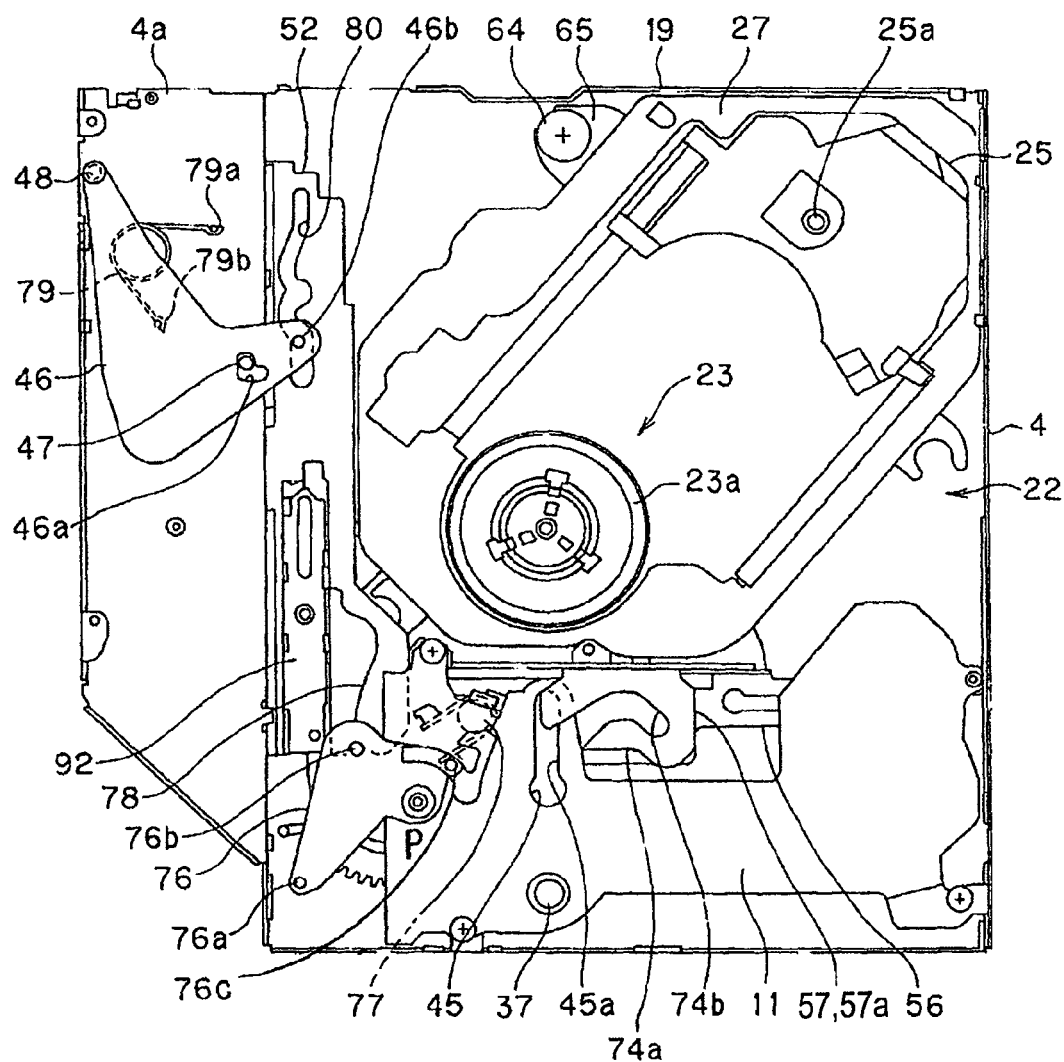
FIG. 7 is a plan view illustrating the disk drive device from which some components are removed.

FIG. 7 is a plan view illustrating the disk drive device 1 from which components including the first and second rotating arms 35 and 36 and the cover plate 150 are removed. The third rotating arm 46 has a substantially L-shaped shaft hole 46a shown in FIG. 7 through which the support shaft 47 extends, a cam pin 46b that engages with a cam groove 80 formed in the top plate of the drive lever 52 shown in FIGS. 10A to 10D, and a third contact member 48 disposed at an end of the third rotating arm 46.

As shown in FIGS. 3 and 7, the third rotating arm 46 is urged by a torsion coil spring 79 disposed on the wing portion 4a. The torsion coil spring 79 is attached to a retaining pin 79a provided on the wing portion 4a at one end thereof and to a retaining pin 79b provided on the bottom surface of the third rotating arm 46 at the other end thereof.

The cam pin 46b moves in the cam groove 80 formed in the drive lever 52 shown in FIG. 5 in association with the sliding movement of the drive lever 52, and accordingly the third rotating arm 46 is rotated. The rotational center of the third rotating arm 46 can be changed depending on the position of the support shaft 47 in the shaft hole 46a.

The third contact member 48 projects upward from the third rotating arm 46 at the end thereof so as to come into contact with the outer peripheral portion of the large-diameter disk 2A that is inserted through the slot 19. The third contact member 48 is a rotating roller with a small diameter that is rotatably attached to a principal surface of the third rotating arm 46 that faces the top plate 5a, and is made of resin that is softer than the disk 2.

Figure 8:
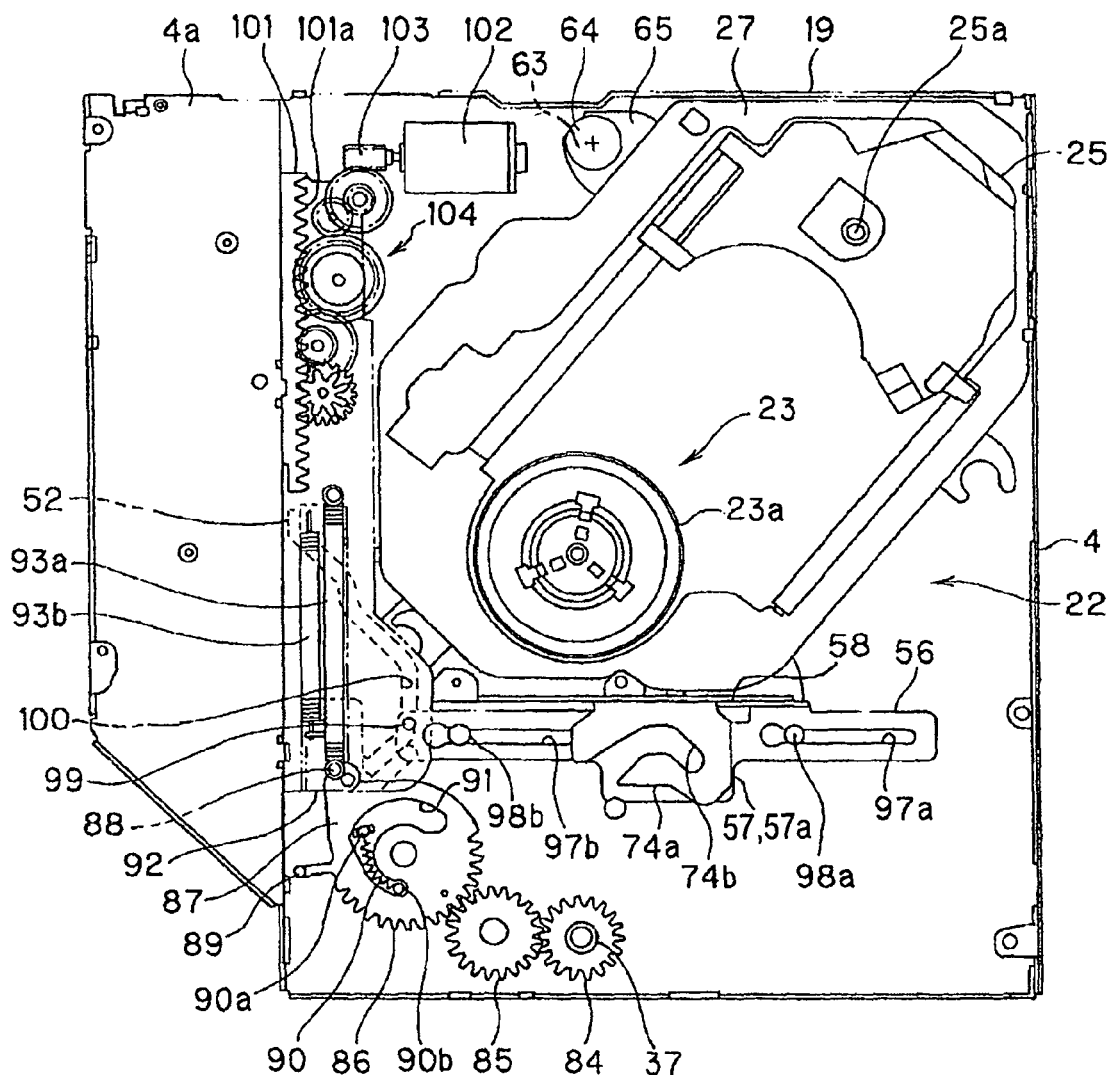
FIG. 8 is a plan view illustrating the disk drive device from which some more components are removed.
Figure 9:
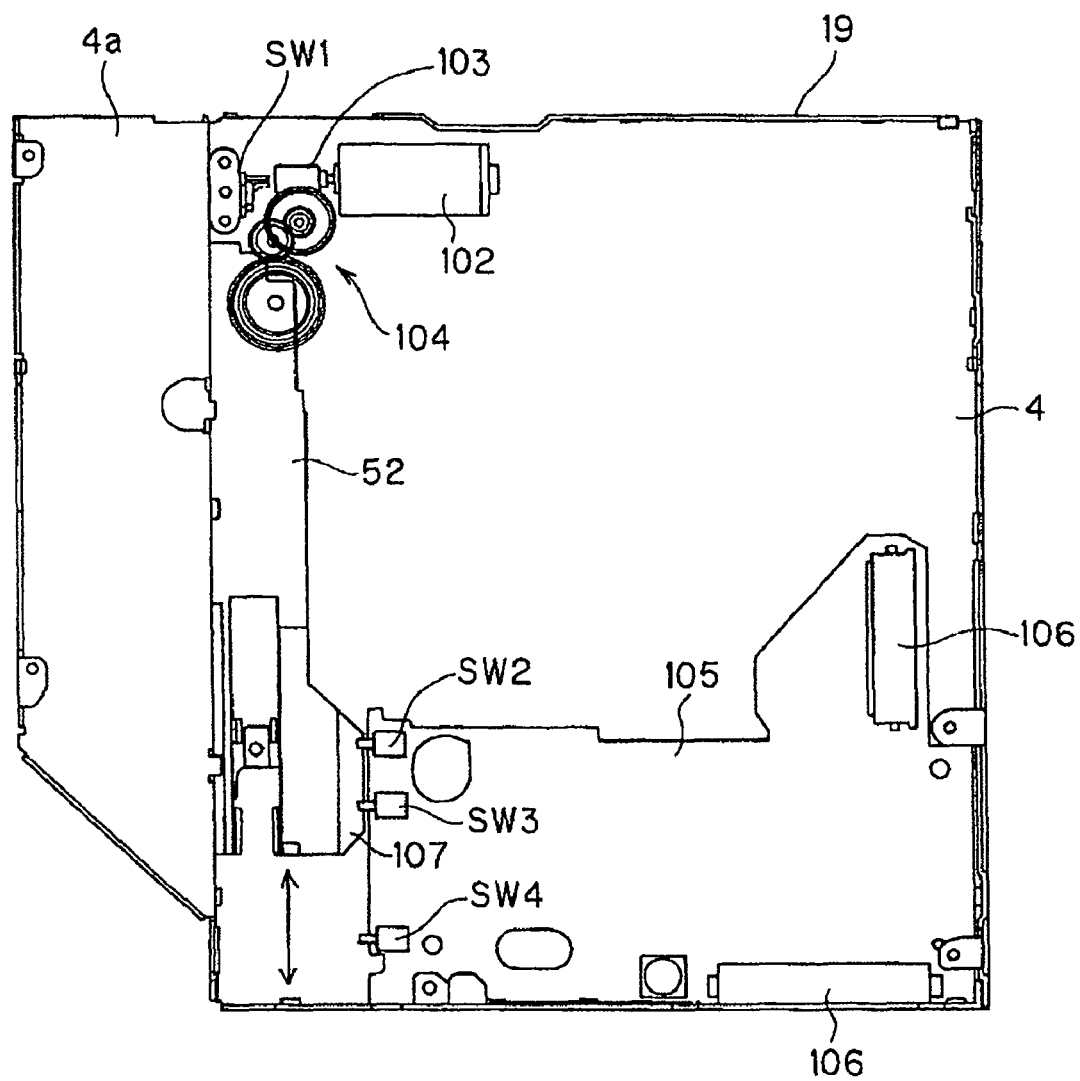
FIG. 9 is a plan view illustrating the positional relationship between a drive lever and detection switches of the disk drive device.

FIG. 8 is a plan view illustrating the disk drive device 1 from which some more components are removed. FIG. 9 is a plan view illustrating the positional relationship between the drive lever 52 and detection switches included in the disk drive device.

The arm mechanism 135 includes the drive lever 52 for driving the rotating arms 35, 36, 46, and 49, etc., in association with each other. The drive lever 52 is made of a substantially prismatic resin body and is disposed between one side of the bottom case 4 and the pickup unit 22 on the bottom plate of the bottom case 4. In addition, the drive lever 52 is positioned below the disk 2 inserted into the housing 3 through the slot 19, and the top surface of the drive lever 52 is at substantially the same height as the bottom surface of the wing portion 4a.

Figures 10A, 10B, 10C, 10D:
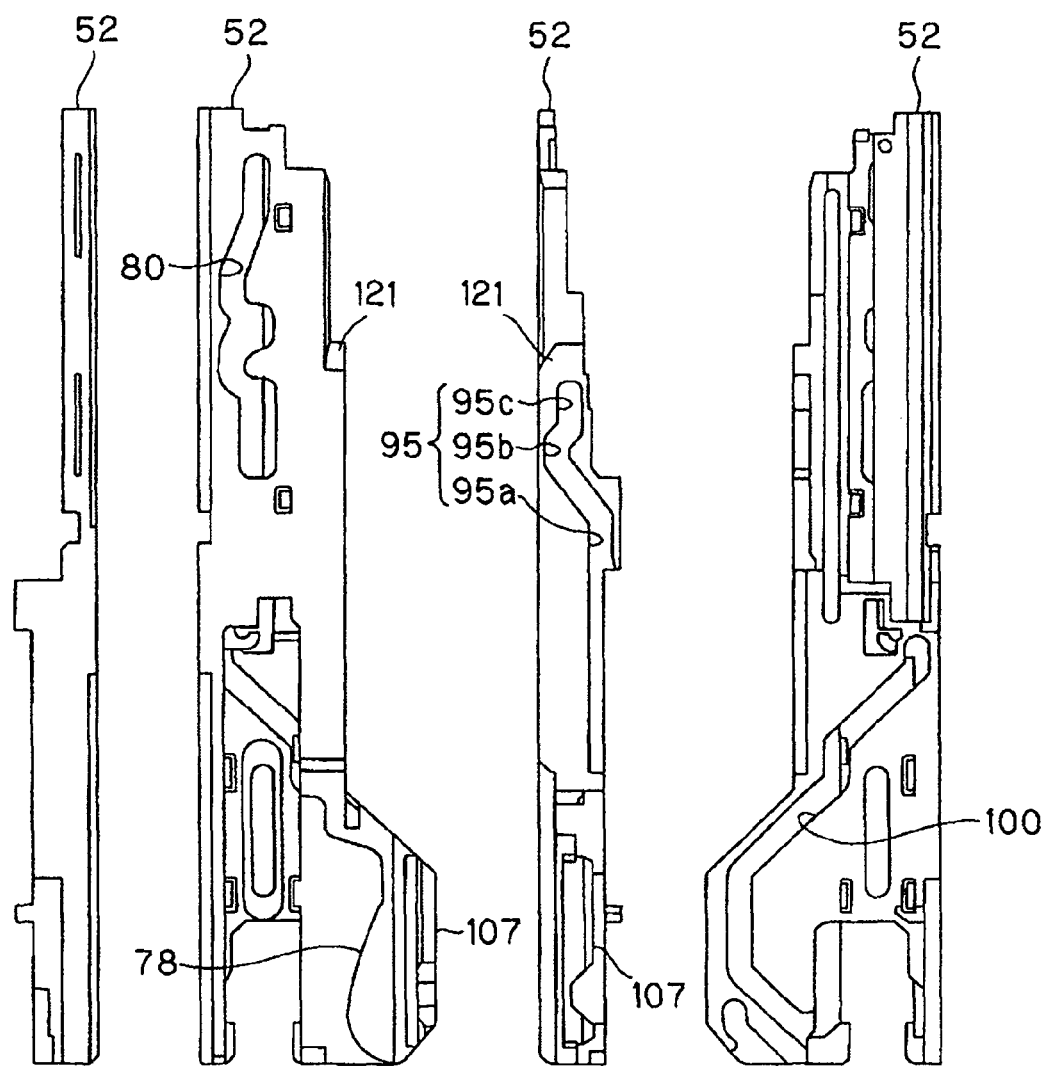
FIG. 10A is a side view of the drive lever viewed from one side.
FIG. 10B is a top plan view of the drive lever.
FIG. 10C is a side view of the drive lever viewed from the other side.
FIG. 10D is a bottom plan view of the drive lever.

FIG. 10A is a side view of the drive lever 52 viewed from one side, FIG. 10B is a top plan view of the drive lever 52, FIG. 10C is a side view of the drive lever 52 viewed from the other side, and FIG. 10D is a bottom plan view of the drive lever 52.

As shown in FIG. 10C, the drive lever 52 has a first cam slit 95 for moving the pickup unit 22 vertically in the side that faces the base plate 27. The first cam slit 95 includes a first horizontal portion 95a for positioning the base plate 27 at the releasing position, a top portion 95b for positioning the base plate 27 at the chucking position, and a second horizontal portion 95c for positioning the base plate 27 at an intermediate position. As shown in FIG. 10D, the drive lever 52 has a guide slit 100 in the bottom side thereof.

As shown in FIGS. 12A, 12B, 13A, and 13B, a rack member 101 that can slide with respect to the drive lever 52 in the front-rear direction by a predetermined stroke is attached to the drive lever 52 at an end adjacent to the front side. The rack member 101 has a rack gear 101a that extends in the front-rear direction. In addition, as shown in FIG. 8, a drive mechanism including a drive motor 102, a worm gear 103 attached to a rotating shaft of the drive motor 102, and a gear train 104 that transmits the power of the drive motor 102 from the worm gear 103 to the rack gear 101a is disposed on the bottom plate of the bottom case 4.

Figures 12A, 12B:
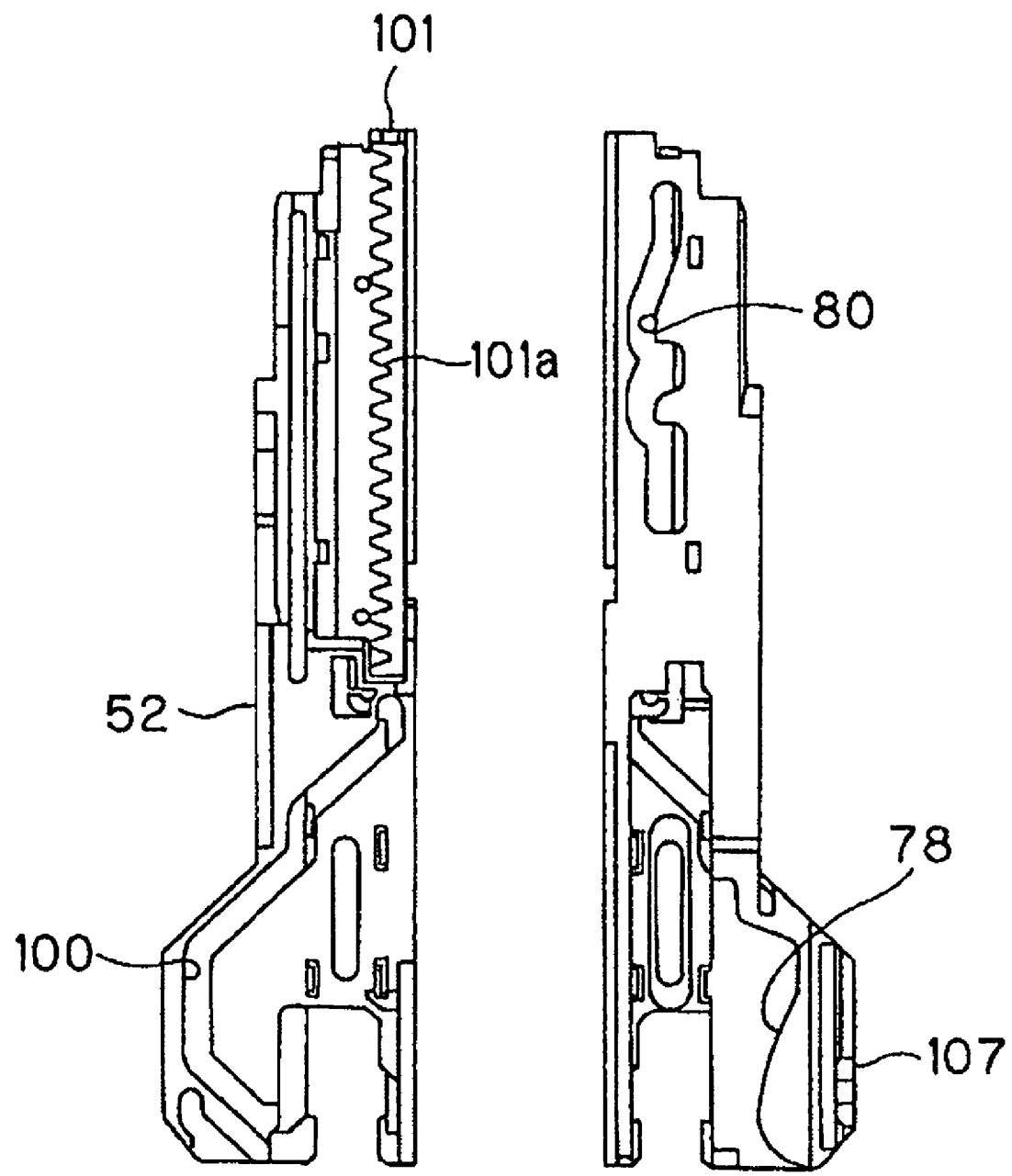
FIG. 12A is a bottom plan view of the drive lever in the load operation and FIG. 12B is a top plan view of the drive lever in the load operation.
Figures 13A, 13B:
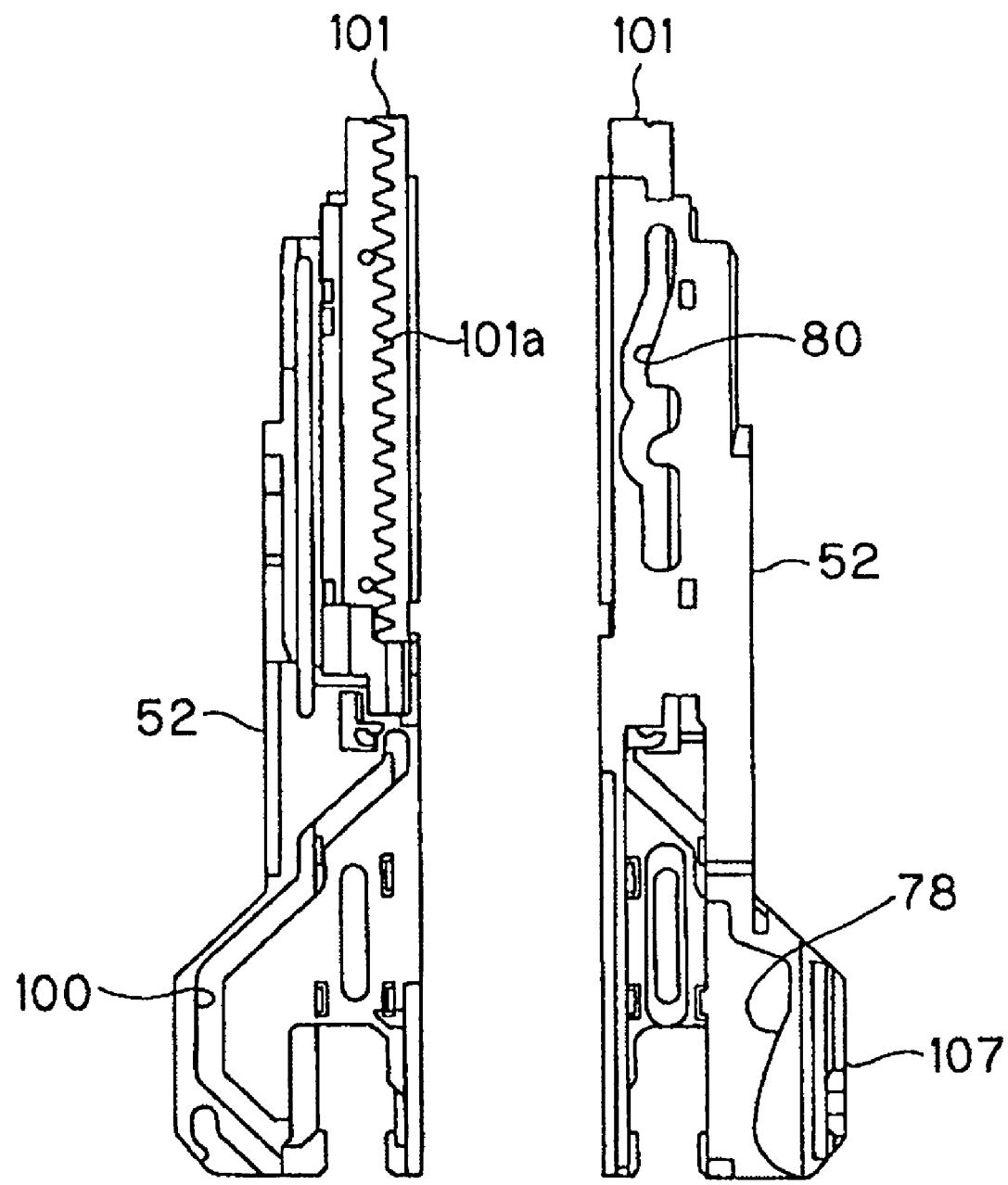
FIG. 13A is a bottom plan view of the drive lever in the eject operation and FIG. 13B is a top plan view of the drive lever in the eject operation.

Accordingly, the drive mechanism rotates the drive motor 102 in one direction to move the drive lever 52 and the rack member 101 together toward the rear side using the worm gear 103, the gear train 104, and the rack gear 101a while the rack member 101 is disposed such that the rack member 101 does not project from the drive lever 52, as shown in FIGS. 12A and 12B. In addition, the drive mechanism rotates the drive motor 102 in the other direction to move the drive lever 52 and the rack member 101 together toward the front side using the worm gear 103, the gear train 104, and the rack gear 101a while the rack member 101 projects frontward from the drive lever 52, as shown in FIGS. 13A and 13B.

The fourth rotating arm 49 is made of a long metal plate and is placed on the left or right of the turntable 23a of the disk mount 23 (on the left in FIG. 3). The fourth rotating arm 49 is rotatably supported at an intermediate position along the second rotating arm 36 such that the fourth rotating arm 49 can rotate in the directions shown by the arrows d1 and d2 in a plane substantially parallel to the recording surface of the disk 2 to assist the eject operation. The fourth rotating arm 49 has a fourth contact member 50 that projects upward at an end of the fourth rotating arm 49 and that comes into contact with a rear peripheral portion of the disk 2. The fourth contact member 50 is made of resin that is softer than the disk 2, and is a rotating roller with a small diameter that is rotatably attached to a principal surface of the fourth rotating arm 49 that faces the top plate 5a.

In addition, the second rotating arm 36 has a restricting tab (not shown) that restricts the rearward rotation of the fourth rotating arm 49 when the fourth rotating arm 49 rotates rearward, that is, in the direction shown by the arrow d1. The restricting tab is formed by, for example, bending an edge of the second rotating arm 36 in a bracket shape.

The fourth rotating arm 49 is rotated by a connecting mechanism 81 shown in FIG. 3 in association with the sliding movement of the drive lever 52 shown in FIG. 7.

More specifically, the connecting mechanism 81 has a crank mechanism including a crank arm 82a that is rotatably supported by the first support shaft 37 and a connection arm 82b that connects the crank arm 82a to the fourth rotating arm 49. The connection arm 82b has a long hole 83b in which a guide pin 83a provided on the second rotating arm 36 is inserted. Accordingly, the crank mechanism rotates the crank arm 82a in association with the rotation of the fourth rotating arm 49.

As shown in FIG. 8, the connecting mechanism 81 also includes a first gear 84 that is rotated by the above-mentioned crank arm 82a, a second gear 85 that meshes with the first gear 84, and a rotating operation member 87 having a third gear 86 that meshes with the second gear 85 on the bottom plate of the bottom case 4.

The rotating operation member 87 serves to rotate the fourth rotating arm 49 in association with the sliding movement of the drive lever 52. The rotating operation member 87 includes an engagement pin 88 that engages with a slide member 92 that can slide in the front-rear direction with respect to the drive lever 52 and a positioning pin 89 for positioning and fixing the drive lever 52 by coming into contact with the rear side of the drive lever 52 in the recording/reproducing operation.

The rotating operation member 87 is urged in one rotational direction (clockwise in FIG. 8 in this case) by an extension spring 90. The extension spring 90 is attached to a retaining pin 90a provided on the bottom plate of the bottom case 4 at one end thereof and to a retaining pin 90b provided on the rotating operation member 87 at the other end thereof. Accordingly, the rotating operation member 87 is urged in one rotational direction. The rotating operation member 87 has a substantially arc shaped slit 91 for receiving the retaining pin 90a.

The slide member 92 that can slide in the front-rear direction with respect to the drive lever 52 is attached to the rear side of the drive lever 52. The slide member 92 is urged frontward by first and second extension springs 93a and 93b, and is engaged with the engagement pin 88 of the rotating operation member 87 at the rear end thereof. Accordingly, the slide member 92 rotates the rotating operation member 87 in association with the sliding operation of the drive lever 52.

The first and the second extension springs 93a and 93b are attached to the drive lever 52 at the front end thereof and are attached to the slide member 92 at the rear end thereof, thereby urging the slide member 92 frontward with respect to the drive lever 52. The first extension spring 93a moves the drive lever 52 and the slide member 92 together in a normal operation and exerts a spring force of about 200 gf to 300 gf. The second extension spring 93b is used to protect the mechanism when the disk 2 is not ejected normally, and exerts a spring force of about 400 gf to 600 gf.

In addition, as shown in FIG. 9, a circuit board 105 on which a drive control circuit for controlling the components is mounted is provided on the bottom plate of the bottom case 4. The circuit board 105 is attached to the bottom plate of the bottom case 4 with screws at a position adjacent to the rear side. Electronic components (not shown), such as an IC chip, that form the drive control circuit, a connector 106 for providing electrical connections, and detection switches SW1, SW2, SW3, and SW4 for detecting various movements are arranged on the bottom plate of the bottom case 4 and the circuit board 105.

The drive control circuit controls the drive mechanism for driving the drive lever 52 while detecting the position of the drive lever 52 on the basis of detection signals obtained by the detection switches SW1, SW2, SW3, and SW4.

The detection switch SW1 is positioned adjacent to the front edge of the bottom case 4, and is switched on and off by the front end of the drive lever 52. The detection switches SW2, SW3, and SW4 are arranged along the front-rear direction with predetermined intervals therebetween along a side edge of the circuit board 105 that faces the drive lever 52. The detection switches SW2, SW3, and SW4 are switched on and off by a cam portion 107 provided on a side surface of the drive lever 52 as shown in FIGS. 10B and 10C.

The restricting mechanism 120 is used for restricting the movement of the arm mechanism 135 when the disk 2 is ejected through the slot 19. As shown in FIG. 3, the restricting mechanism 120 includes a pushing lever 76, a stopper 110 that engages with the pushing lever 76 when the disk 2 is ejected, and a second torsion coil spring 77 that presses the pushing lever 76. The stopper 110 is provided on, for example, the second rotating arm 36 and has a step-like portion that comes into contact with a contact pin 76a when the disk 2 is ejected through the slot 19. The stopper 110 has a contact surface that faces and comes into contact with the contact pin 76a in the rotational direction of the pushing lever 76.

As shown in FIG. 7, the second torsion coil spring 77 is attached to the chassis 11 at one end and to a contact pin 76c of the pushing lever 76 at the other end while a winding portion of the second torsion coil spring 77 is supported by the chassis 11. Accordingly, the contact pin 76a is urged in a direction such that the contact pin 76a comes into contact with the stopper 110. The contact pin 76c is rotatable around the point P shown in FIG. 7. A pushing force applied to the disk 2 by the arm mechanism 135 when the contact pin 76a engages with the stopper 110 in the ejection operation of the disk 2 is set to be smaller than the frictional force applied to the disk 2 at the slot 19. The first torsion coil spring 75, for example, applies a rotating force to the first rotating arm 35 and the second rotating arm 36 such that the engagement between the contact pin 76a of the pushing lever 76 and the stopper 110 is canceled when the disk 2 is pulled out from the slot 19.

Accordingly, in the restricting mechanism 120, the cam pin 76b on the pushing lever 76 slides along a cam groove 78 formed in the drive lever 52 in association with the rearward sliding movement of the drive lever 52, and the pushing lever 76 rotates against the urging force applied by the second torsion coil spring 77 when the drive lever 52 reaches the rear end. Thus, the state in which the pushing lever 76 presses the second rotating arm 36 to urge the first rotating arm 35 and the second rotating arm 36 toward each other is switched to the state in which the first rotating arm 35 and the second rotating arm 36 are not urged toward each other.

The arm mechanism 135 performs a load operation for pulling the disk 2 into the housing 3 through the slot 19, a centering operation for positioning the disk 2 at the disk mounting position, and an eject operation for ejecting the disk 2 from the housing 3 through the slot 19 by causing the first rotating arm 35, the second rotating arm 36, the third rotating arm 46, and the fourth rotating arm 49 to operate in corporation with each other.

As shown in FIG. 3, the disk drive device 1 includes a base-lifting mechanism 55 that moves the base plate 27 vertically in association with the sliding movement of the drive lever 52.

Figure 14:
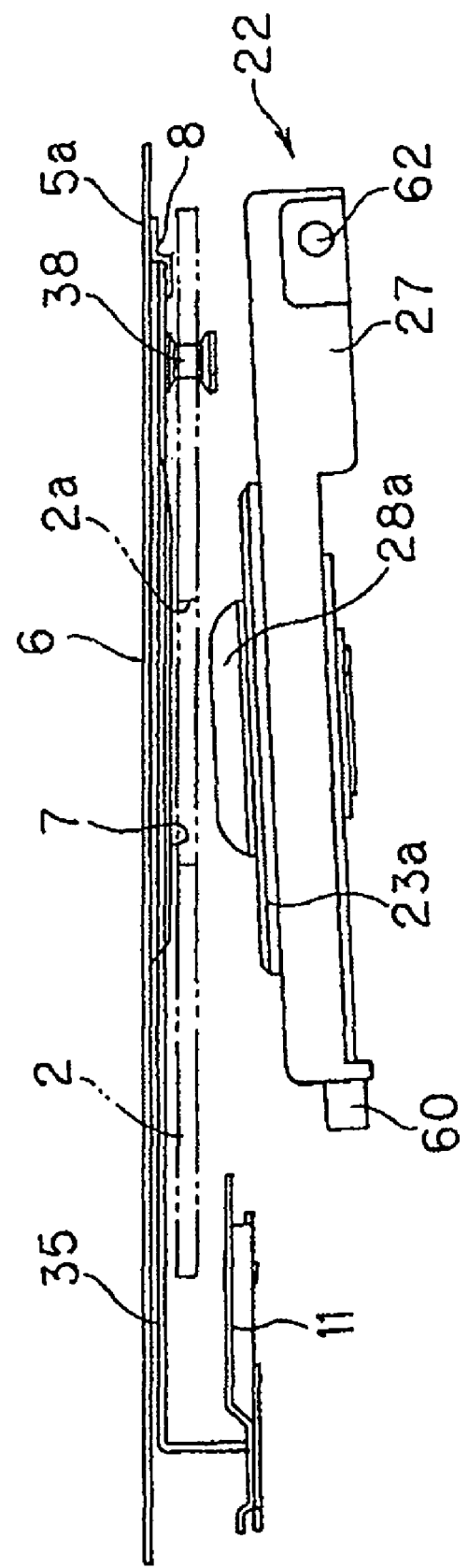
FIG. 14 is a side view illustrating the state in which the pickup unit is at a releasing position in the operation of the disk drive device.
Figure 15:
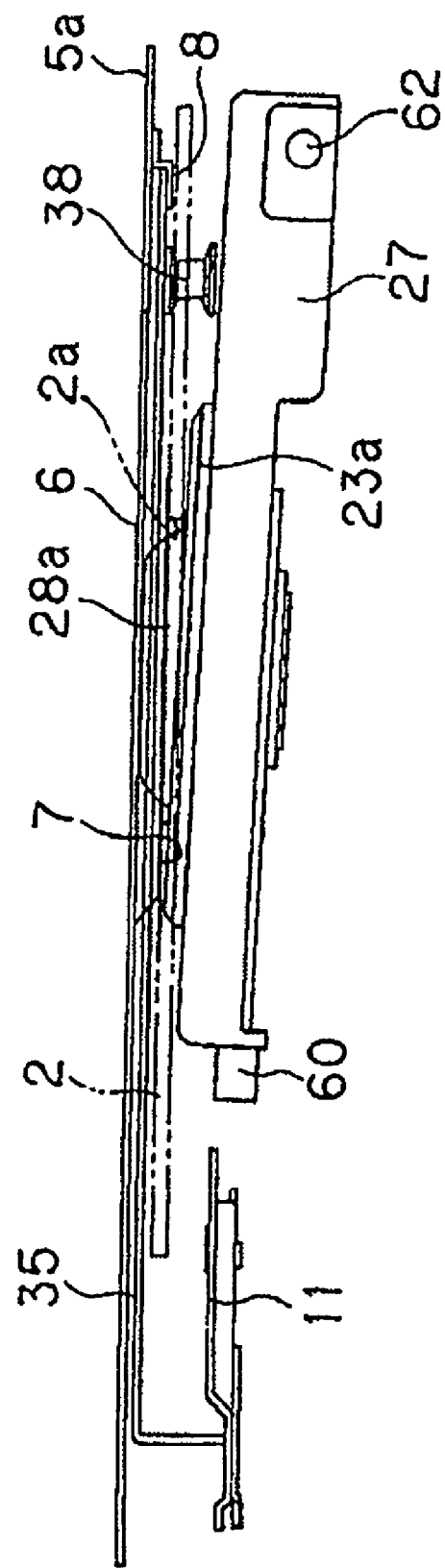
FIG. 15 is a side view illustrating the state in which the pickup unit is at a chucking position in the operation of the disk drive device.
Figure 16:
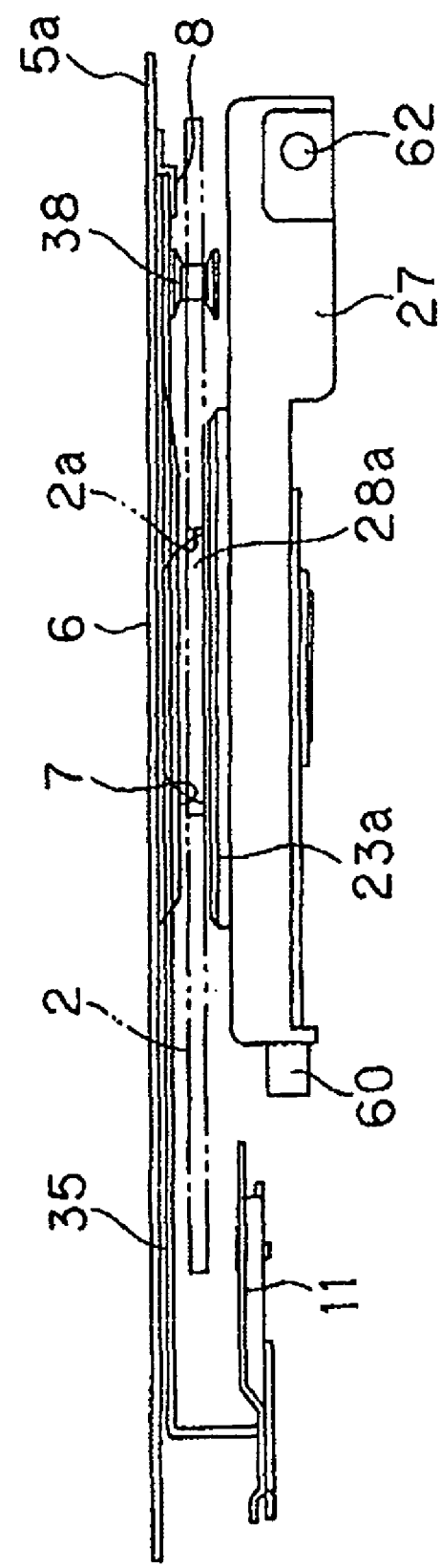
FIG. 16 is a side view illustrating the state in which the pickup unit is at an intermediate position in the operation of the disk drive device.

The base-lifting mechanism 55 moves the base plate 27 upward to a chucking position shown in FIG. 15 where the disk 2 positioned at the disk mounting position is placed on the turntable 23a of the disk mount 23, downward to a releasing position shown in FIG. 14 where the disk 2 is released from the turntable 23a of the disk mount 23, and to an intermediate position between the chucking position and the releasing position shown in FIG. 16 where signals are recorded on or reproduced from the disk 2. The cover plate 150 is not shown in FIGS. 14 to 16.

More specifically, as shown in FIG. 10C, the drive lever 52 has the first cam slit 95 having portions corresponding to the chucking position, the releasing position, and the intermediate position and that extends in the longitudinal direction of the drive lever 52 in the side that faces the base plate 27.

In addition, as shown in FIG. 7, the cam lever 56 that extends along the rear side of the base plate 27 is arranged on the bottom plate of the bottom case 4. As shown in FIGS. 11A and 11B, the cam lever 56 is made of a long, flat plate member and slides in a direction substantially perpendicular to the sliding direction of the drive lever 52 as the drive lever 52 slides in the front-rear direction. The cam lever 56 has a cam tab 57 that is bent upward along the side of the cam lever 56 that faces the base plate 27 at an intermediate position thereof. As shown in FIG. 7, a horizontal portion 57a of the cam tab 57 has a first cam portion 74a that corresponds to the large-diameter disk 2A with a diameter of 12 cm and a second cam portion 74b that corresponds to the small-diameter disk 2B and that is formed as a slit-shaped cutout at a position closer to the front side than the first cam portion 74a. As shown in FIG. 11B, the cam tab 57 has a second cam slit 96 that includes portions corresponding to the chucking position, the releasing position, and the intermediate position and that extends in the longitudinal direction of the cam tab 57.

The second cam slit 96 includes a first horizontal portion 96a for positioning the base plate 27 at the releasing position, a top portion 96b for positioning the base plate 27 at the chucking position, and a second horizontal portion 96c for positioning the base plate 27 at the intermediate position.

The cam lever 56 has a pair of guide slits 97a and 97b that are aligned with each other in the principal plane of the cam lever 56, and a pair of headed guide pins 98a and 98b that project from the bottom plate of the bottom case 4 are engaged with the guide slits 97a and 97b, respectively, as shown in FIG. 8. Accordingly, the cam lever 56 is supported such that the cam lever 56 can slide in the direction substantially perpendicular to the sliding direction of the drive lever 52, that is, in the left-right direction along the rear side of the base plate 27.

The cam lever 56 has a guide pin 99 shown in FIG. 8 that projects upward at the intersecting point of the cam lever 56 and the drive lever 52. As shown in FIG. 8, the guide pin 99 slides along the guide slit 100 in association with the sliding movement of the drive lever 52 in the front-rear direction, and accordingly the cam lever 56 slides in the direction perpendicular to the sliding direction of the drive lever 52.

In the link mechanism 41, the second support shaft 44 becomes engaged with the first cam portion 74a or the second cam portion 74b depending on the positional relationship between the first rotating arm 35 and the second rotating arm 36 that differs between the case in which the large-diameter disk 2A is inserted into the housing 3 through the slot 19 and the case in which the small-diameter disk 2B is inserted into the housing 3 through the slot 19.

More specifically, when the large-diameter disk 2A is inserted, the second support shaft 44 becomes engaged with the first cam portion 74a and slides along the guide slit 45 in association with the sliding movement of the cam lever 56 in the left-right direction. Accordingly, the first rotating arm 35 and the second rotating arm 36 are rotated toward or away from each other in accordance with the outer diameter of the large-diameter disk 2A.

When the small-diameter disk 2B is inserted, the second support shaft 44 becomes engaged with the second cam portion 74b and slides along the guide slit 45 in association with the sliding movement of the cam lever 56 in the left-right direction. Accordingly, the first rotating arm 35 and the second rotating arm 36 are rotated toward or away from each other in accordance with the outer diameter of the small-diameter disk 2B.

In addition, as shown in FIG. 8, a bent member 58 that is bent along the rear side of the base plate 27 is provided on the bottom plate of the bottom case 4. The bent member 58 has a vertical slit (not shown) for moving the base plate 27 vertically.

The first support shaft 59 shown in FIGS. 4 and 5 that is formed on the base plate 27 is supported by being engaged the first cam slit 95 formed in the drive lever 52 shown in FIG. 10C. The second support shaft 60 is supported by being engaged with the second cam slit 96 formed in the cam tab 57 and the vertical slit formed in the bent member 58. The third support shaft 62 is rotatably supported by a shaft hole 61 formed in a side plate of the bottom case 4. The fixing support portion 65 is fixed and supported on the bottom plate of the bottom case 4 with a screw 64 with an insulator 63 formed of a viscoelastic member, such as rubber, interposed between the fixing support portion 65 and the bottom plate of the bottom case 4.

Accordingly, in the base-lifting mechanism 55, the first support shaft 59 slides in the first cam slit 95 formed in the drive lever 52 and the second support shaft 60 slides in the second cam slit 96 formed in the cam lever 56 and the vertical slit formed in the bent member 58 in association with the sliding movements of the drive lever 52 and the cam lever 56. Thus, a section of the base plate 27 in which the disk mount 23 is mounted moves vertically with respect to a section of the base plate 27 adjacent to the front side between the chucking position, the releasing position, and the intermediate position.

Referring to FIG. 3, a push-up pin 66 for removing the disk 2 mounted on the turntable 23a of the disk mount 23 from the turntable 23a when the base plate 27 is moved downward by the base-lifting mechanism 55 is provided on the bottom plate of the bottom case 4. The push-up pin 66 projects upward from the bottom plate of the bottom case 4 at a position near the disk mount 23 of the pickup unit 22, more specifically, at a position closest to the disk mount 23 along the rear side of the base plate 27.

Next, the operation of the disk drive device 1 having the above-described structure will be described below. First, the disk-conveying operation performed by the arm mechanism 135 when the disk 2 is inserted will be described below.

Figure 17:
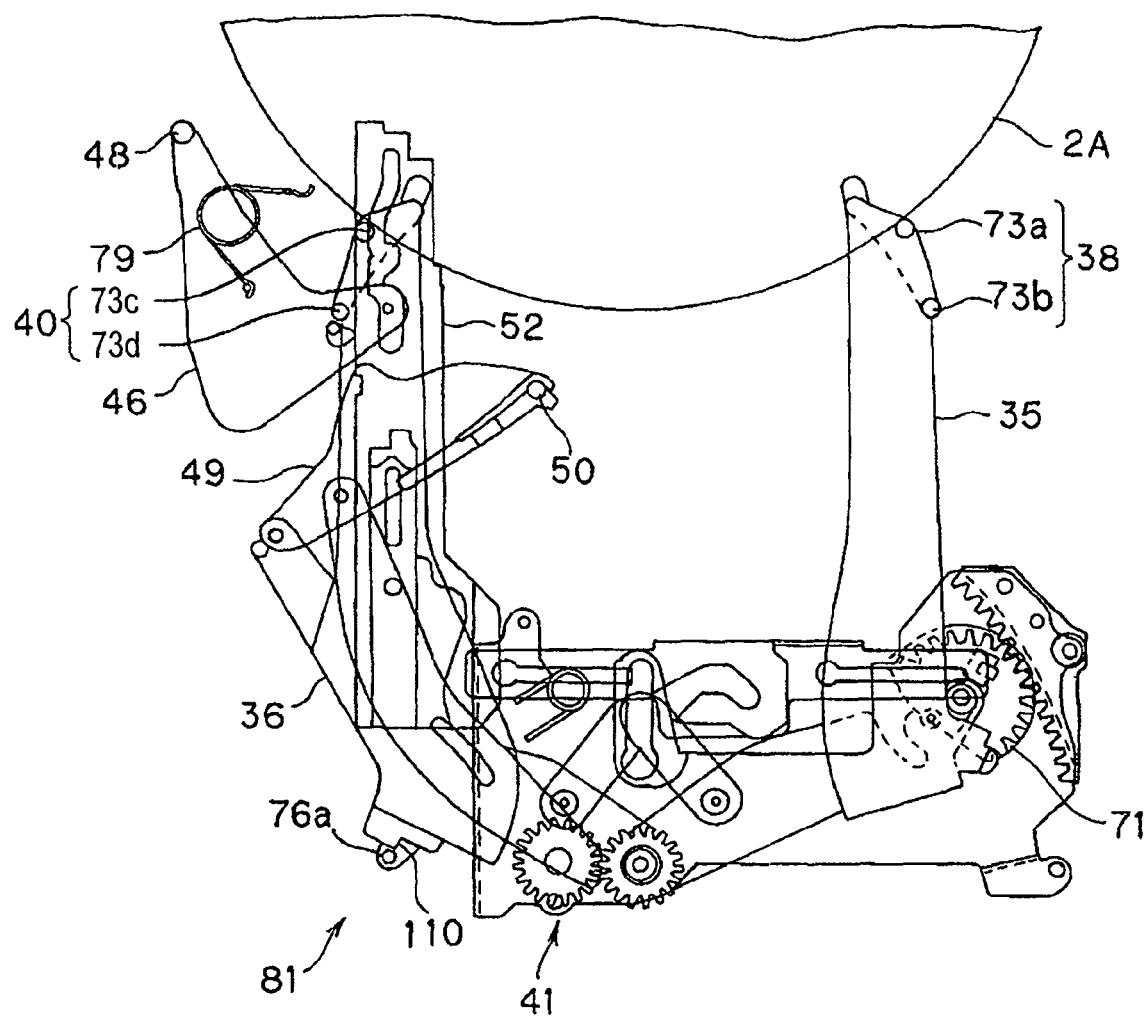
FIG. 17 is a plan view illustrating the state in which insertion of a large-diameter disk is started in the operation of the disk drive device.

As shown in FIG. 17, in the initial state (HOME state) in which the disk 2 is not yet inserted, the end portions of the first rotating arm 35 and the second rotating arm 36 are separated from each other by a predetermined angle in the disk drive device 1. More specifically, as shown in FIG. 3, the minimum distance L2 between the rotating roller 73a of the first front contact member 38 and the rotating roller 73c of the second front contact member 40 is smaller than the diameter of a small-diameter disk 2B.

In the HOME state, the third rotating arm 46 is positioned such that the front end thereof is farther away from the center in the left-right direction and closer to the front side than the base end thereof, and the fourth rotating arm 49 is positioned in the front section of the bottom case 4 such that the front end thereof is closer to the center in the left-right direction and closer to the front side than the base end thereof.

The disk drive device 1 can perform the load operation irrespective of whether the large-diameter disk 2A or the small-diameter disk 2B is inserted into the housing 3 through the slot 19.

More specifically, when the large-diameter disk 2A is inserted into the housing 3 through the slot 19, a rear peripheral portion of the large-diameter disk 2A that is inserted into the housing 3 through the slot 19 comes into contact with the first front contact member 38 of the first rotating arm 35 and the second front contact member 40 of the second rotating arm 36, as shown in FIG. 17.

Figure 18:
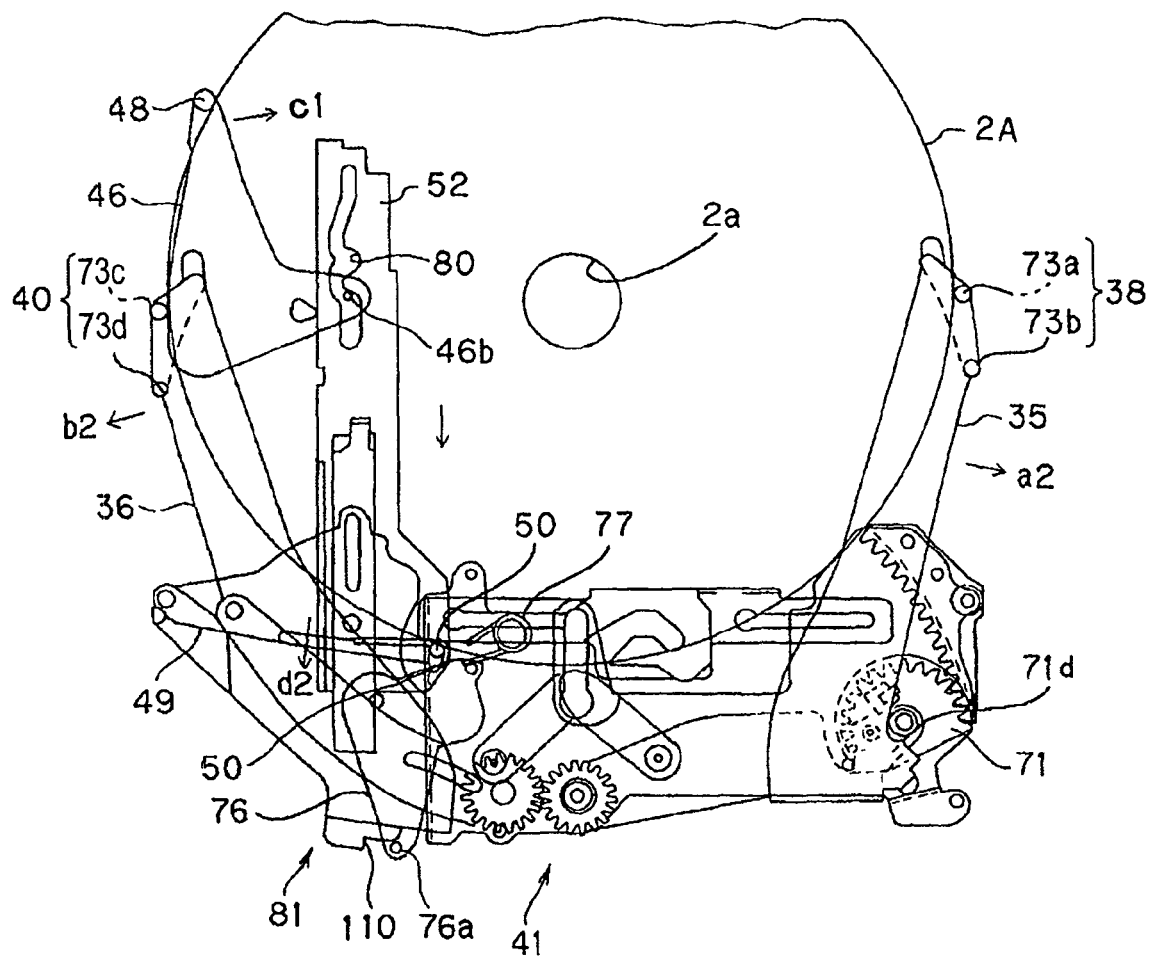
FIG. 18 is a plan view illustrating the state in which the process of pulling the large-diameter disk inward is started in the operation of the disk drive device.

Then, when the large-diameter disk 2A inserted through the slot 19 is pushed further into the housing 3, as shown in FIG. 18, the large-diameter disk 2A is held between the first front contact member 38 and the second front contact member 40 of the first rotating arm 35 and the second rotating arm 36, respectively, at the outer peripheral portion thereof. At this time, the first rotating arm 35 and the second rotating arm 36 are rotated away from each other, that is, in the directions shown by the arrows a2 and b2 in FIG. 18, against the urging forces applied by the torsion coil spring 71d and the second torsion coil spring 77 while the first front contact member 38 and the second front contact member 40 are in contact with the rear peripheral portion of the large-diameter disk 2A.

Then, when the third rotating arm 46 is rotated by a predetermined amount and reaches the position shown in FIG. 18, the detection switch SW2 provided on the circuit board 105 is pressed, which causes the drive mechanism to start sliding the drive lever 52 rearward.

Accordingly, the third rotating arm 46 is further rotated in the direction shown by the arrow c1 in FIG. 18. In addition, the third contact member 48 of the third rotating arm 46 comes into contact with a front peripheral portion of the large-diameter disk 2A and pushes the front peripheral portion of the large-diameter disk 2A so as to move the large-diameter disk 2A into the housing 3.

Figure 19:
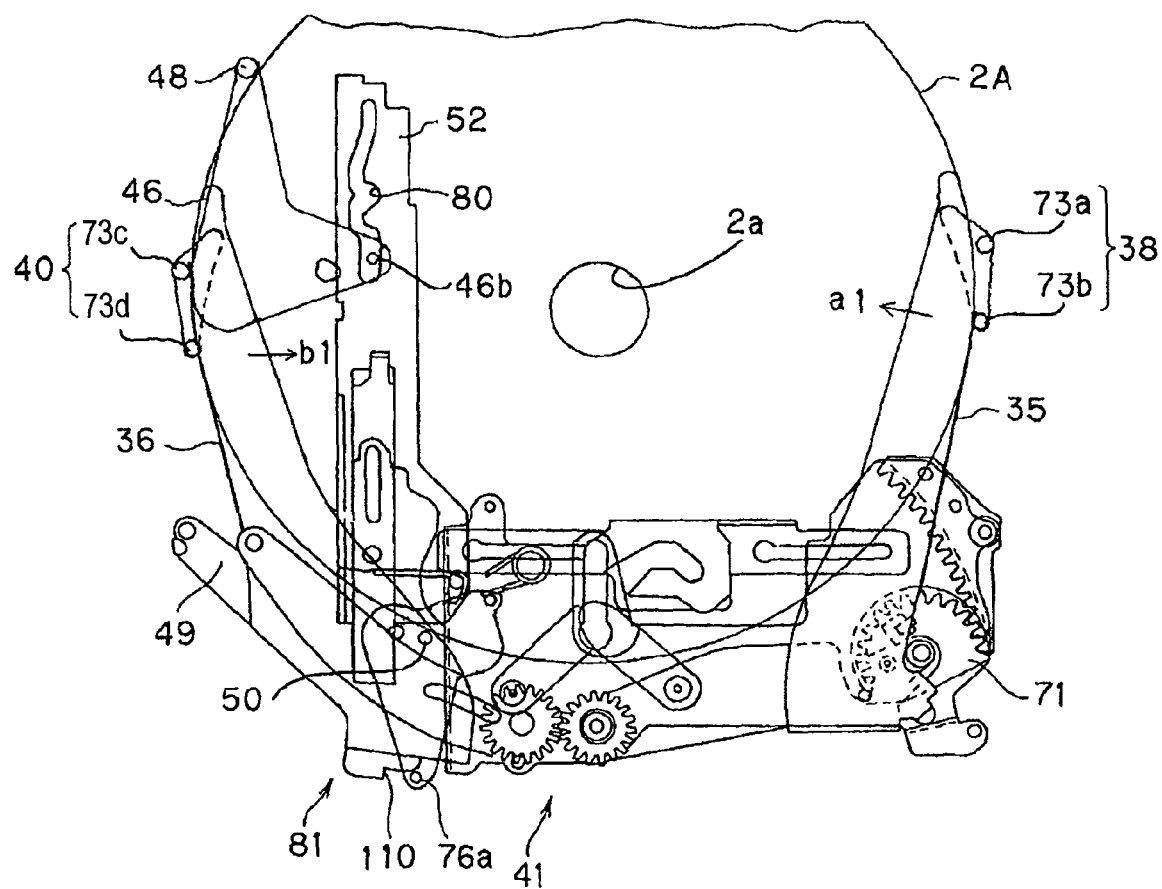
FIG. 19 is a plan view illustrating the state in which the large-diameter disk is being pulled inward in the operation of the disk drive device.

Then, when the large-diameter disk 2A moved into the housing 3 reaches a position where the center hole 2a of the large-diameter disk 2A is closer to the rear side than the line connecting the first front contact member 38 and the second front contact member 40, as shown in FIG. 19, the first front contact member 38 and the second front contact member 40 move from the rear peripheral portion of the large-diameter disk 2A to the front peripheral portion thereof. Accordingly, the first rotating arm 35 and the second rotating arm 36 are rotated toward each other, that is, in the directions shown by the arrows a1 and b1 in FIG. 20, by the urging forces applied by the torsion coil spring 71d and the second torsion coil spring 77 while the first front contact member 38 and the second front contact member 40 are in contact with the front peripheral portion of the large-diameter disk 2A.

Figure 20:
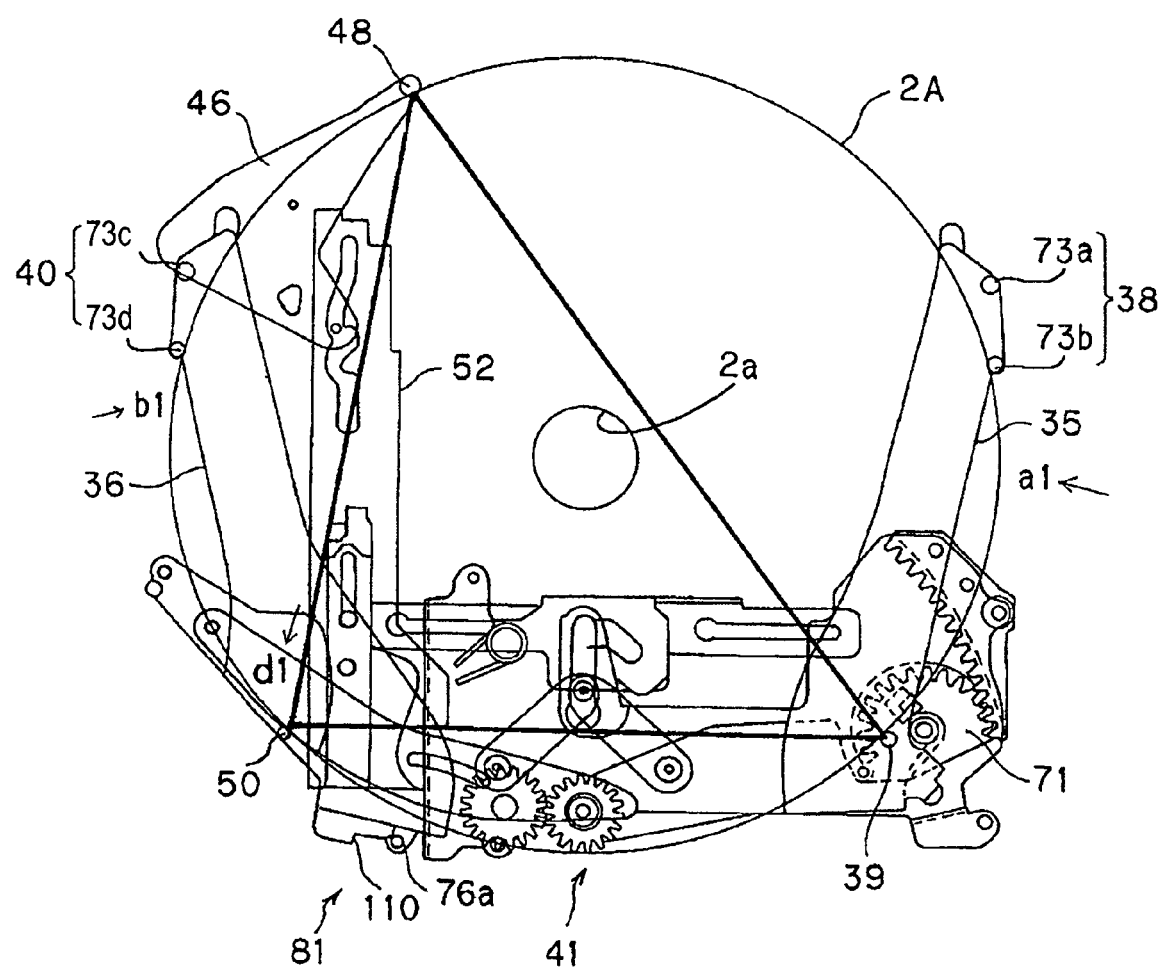
FIG. 20 is a plan view illustrating the state in which the large-diameter disk is positioned at the center in the operation of the disk drive device.

In addition, the fourth contact member 50 of the fourth rotating arm 49 is pushed by the rear peripheral portion of the large-diameter disk 2A and accordingly the fourth rotating arm 49 is rotated in the direction shown by the arrow d1 in FIG. 20. Then, when the large-diameter disk 2A reaches the disk mounting position shown in FIG. 20, the fourth rotating arm 49 comes into contact with the restricting tab (not shown) of the second rotating arm 36 and the rotation of the fourth rotating arm 49 is restricted.

Accordingly, the first rotating arm 35 and the second rotating arm 36 convey the large-diameter disk 2A inward to the disk mounting position shown in FIG. 20 while pushing the front peripheral portion of the large-diameter disk 2A.

Figure 24:
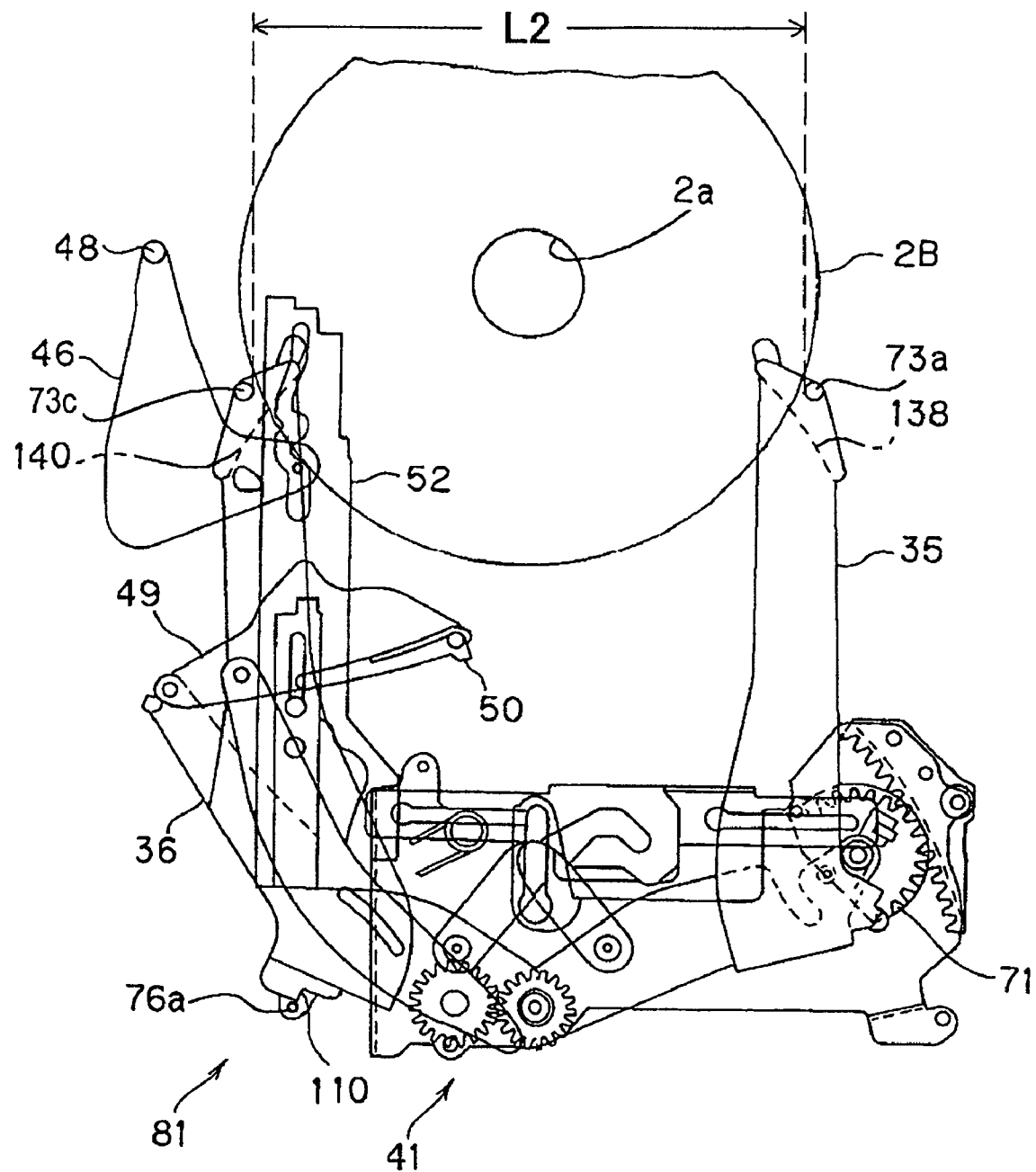
FIG. 24 is a plan view illustrating the state in which insertion of a small-diameter disk is started in the operation of the disk drive device.

When the small-diameter disk 2B is inserted into the housing 3 through the slot 19, a rear peripheral portion of the small-diameter disk 2B that is inserted into the housing 3 through the slot 19 comes into contact with the first front contact member 38 of the first rotating arm 35 and the second front contact member 40 of the second rotating arm 36, as shown in FIG. 24.

Figure 25:
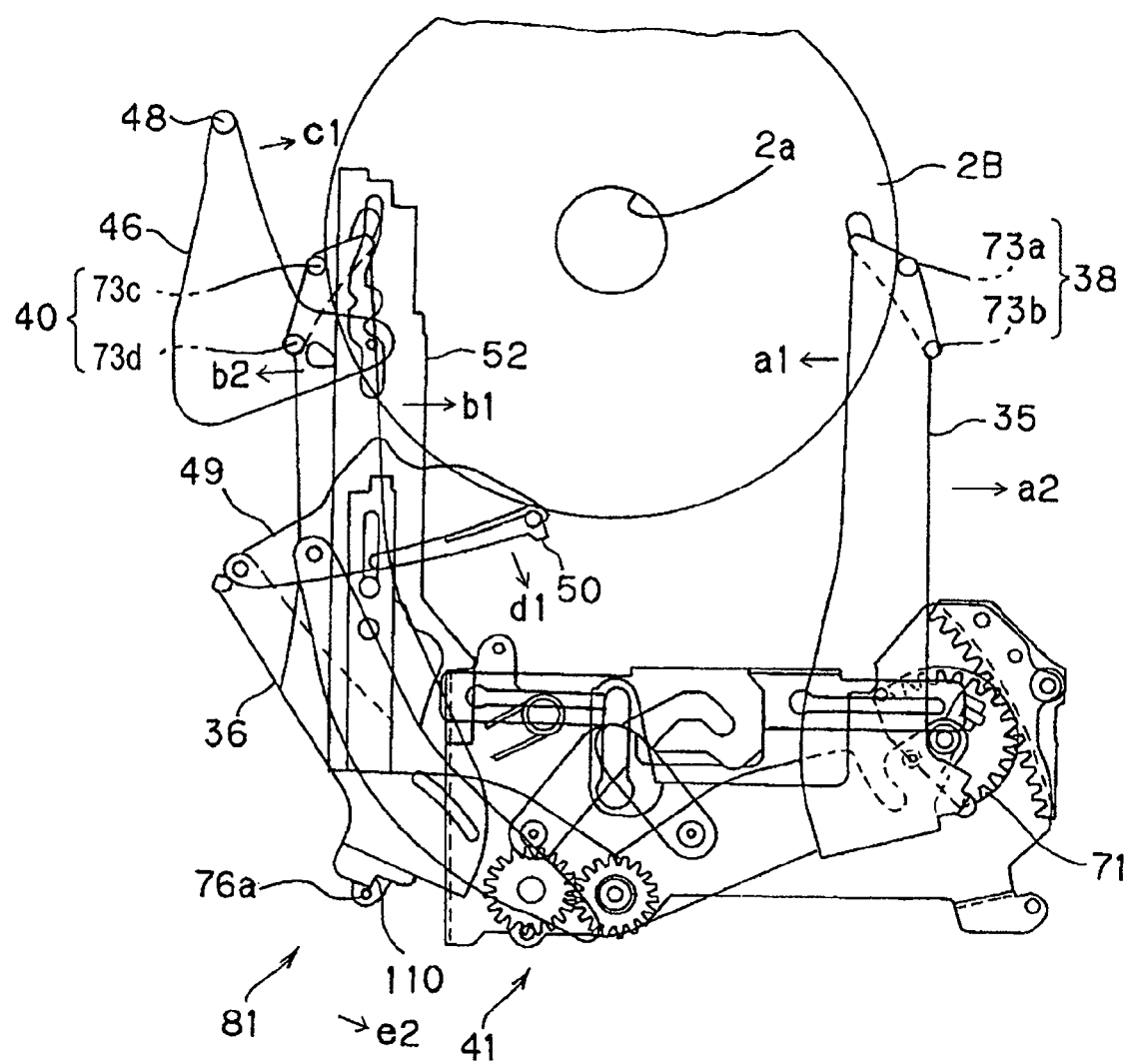
FIG. 25 is a plan view illustrating the state in which a detection switch that detects the insertion of the small-diameter disk is pressed in the operation of the disk drive device.

Then, when the small-diameter disk 2B inserted through the slot 19 is pushed further into the housing 3, as shown in FIG. 25, the small-diameter disk 2B is held between the first front contact member 38 and the second front contact member 40 of the first rotating arm 35 and the second rotating arm 36, respectively, at the outer peripheral portion thereof. At this time, the first rotating arm 35 and the second rotating arm 36 are rotated away from each other, that is, in the directions shown by the arrows a2 and b2 in FIG. 25, against the urging forces applied by the torsion coil spring 71d and the second torsion coil spring 77 while the first front contact member 38 and the second front contact member 40 are in contact with the rear peripheral portion of the small-diameter disk 2B.

Then, when the fourth rotating arm 49 is rotated by a predetermined amount and reaches the position shown in FIG. 25, the detection switch SW2 provided on the circuit board 105 is pressed, which causes the drive mechanism to start sliding the drive lever 52 rearward.

Accordingly, the third rotating arm 46 is rotated in the direction shown by the arrow c1 in FIG. 25. The third contact member 48 of the third rotating arm 46 comes into contact with a front peripheral portion of the small-diameter disk 2B and pushes the front peripheral portion of the small-diameter disk 2B so as to move the small-diameter disk 2B into the housing 3 through the slot 19.

Figure 26:
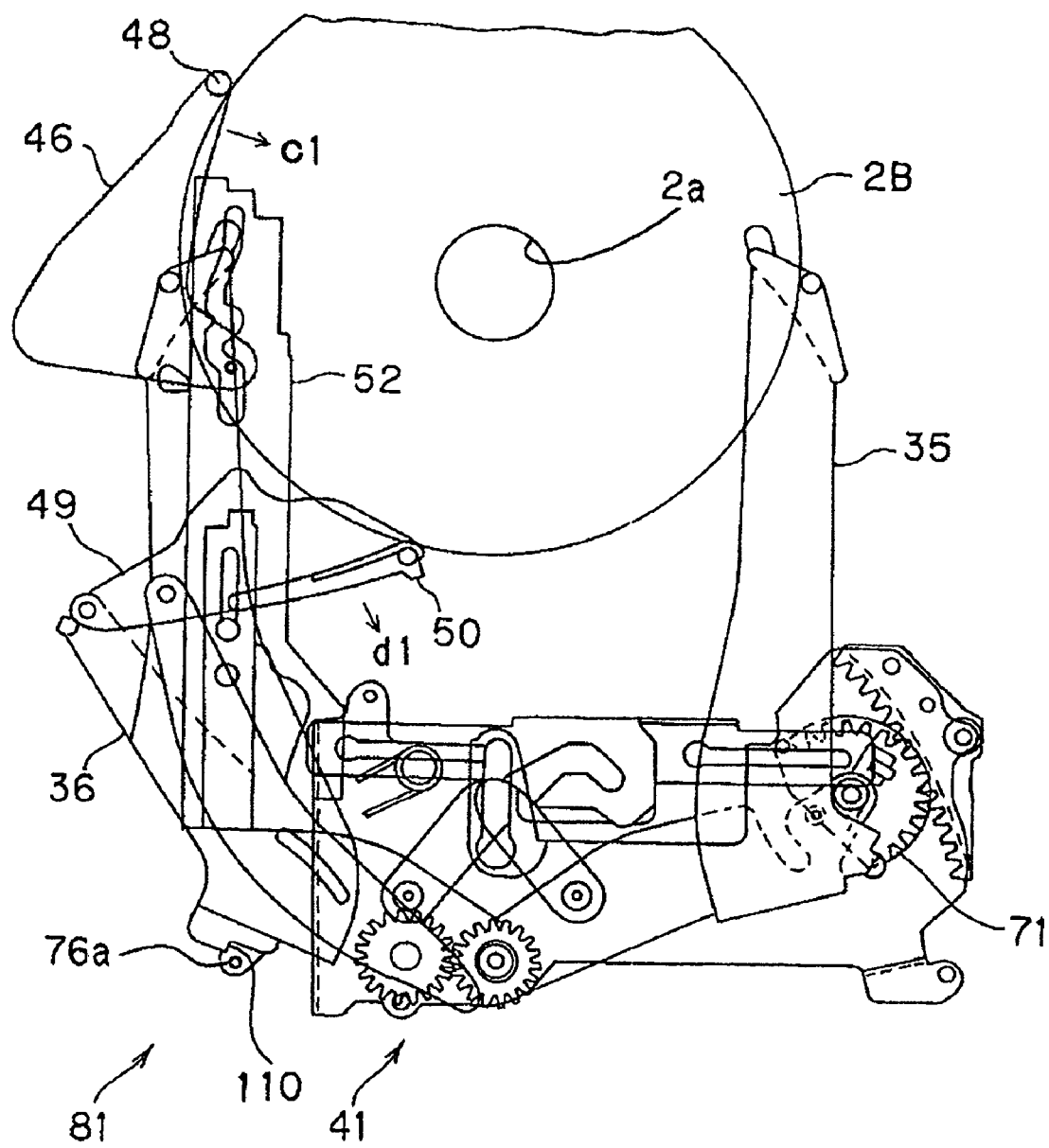
FIG. 26 is a plan view illustrating the state in which the process of pulling the small-diameter disk inward is started in the operation of the disk drive device.

Then, when the small-diameter disk 2B moved into the housing 3 reaches a position where the center hole 2a of the small-diameter disk 2B is closer to the rear side than the line connecting the first front contact member 38 and the second front contact member 40, as shown in FIG. 26, the first front contact member 38 and the second front contact member 40 move from the rear peripheral portion of the small-diameter disk 2B to the front peripheral portion thereof. Accordingly, the first rotating arm 35 and the second rotating arm 36 are rotated toward each other, that is, in the directions shown by the arrows a1 and b1 in FIG. 27, by the urging forces applied by the torsion coil spring 71d and the second torsion coil spring 77 while the first front contact member 38 and the second front contact member 40 are in contact with the front peripheral portion of the small-diameter disk 2B.

Figure 27:
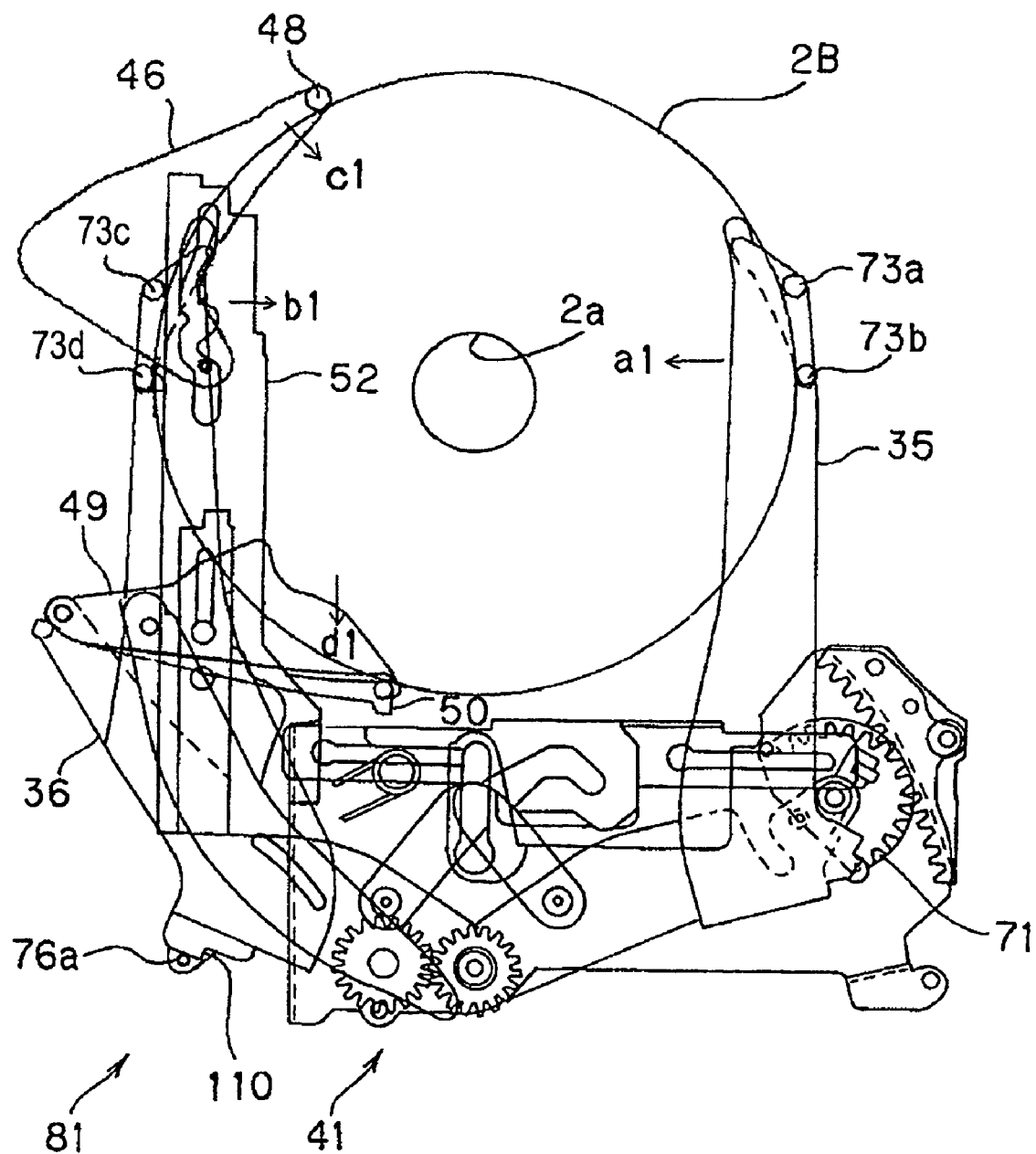
FIG. 27 is a plan view illustrating the state in which the small-diameter disk is being pulled inward in the operation of the disk drive device.

In addition, the fourth contact member 50 of the fourth rotating arm 49 is pushed by the rear peripheral portion of the small-diameter disk 2B and accordingly the fourth rotating arm 49 is rotated in the direction shown by the arrow d1 in FIG. 27. Then, when the small-diameter disk 2B reaches the disk mounting position shown in FIG. 28, the fourth rotating arm 49 comes into contact with the restricting tab (not shown) of the second rotating arm 36 and the rotation of the fourth rotating arm 49 is restricted.

Figure 28:
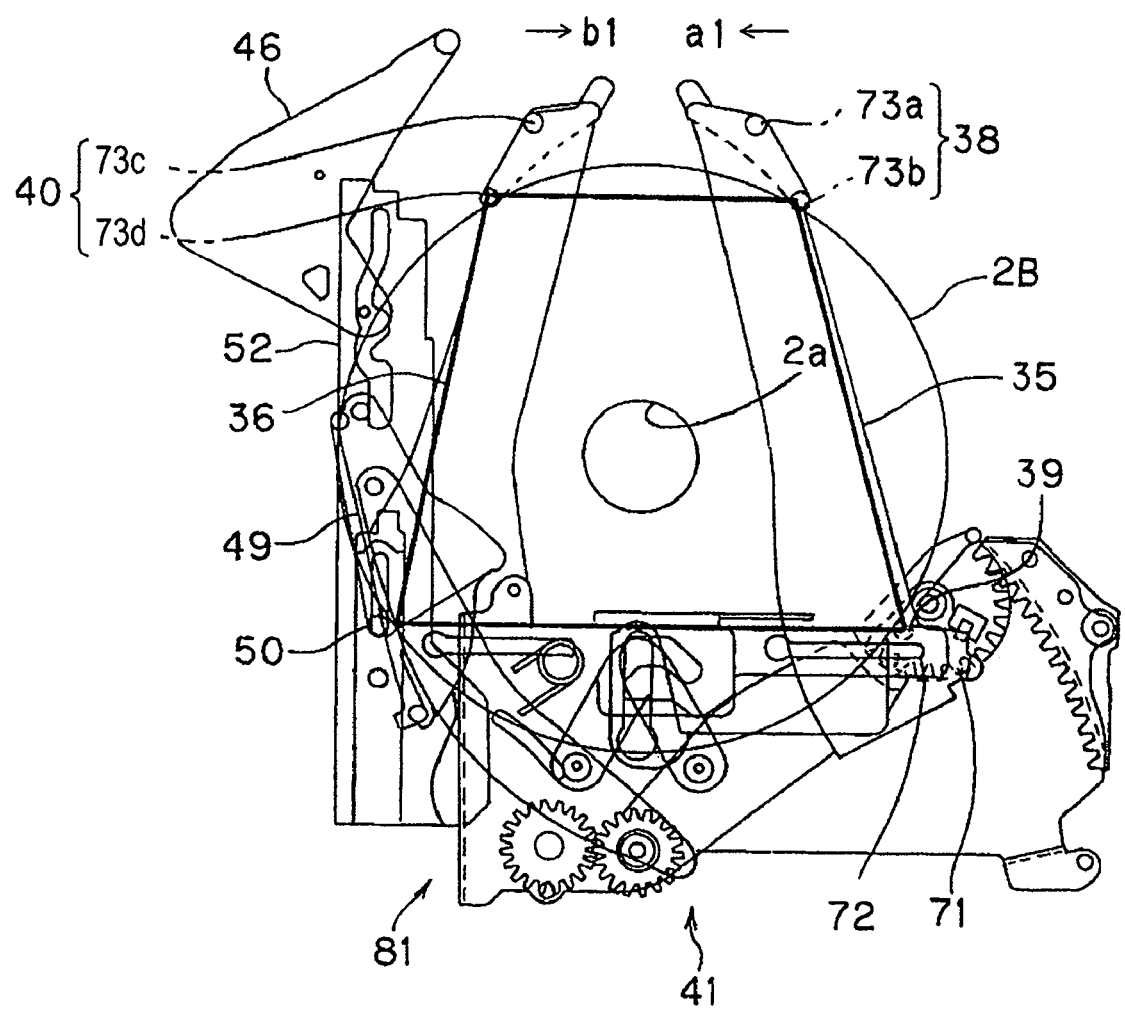
FIG. 28 is a plan view illustrating the state in which the small-diameter disk is positioned at the center and the eject operation is started in the disk drive device.

Accordingly, the first rotating arm 35 and the second rotating arm 36 convey the small-diameter disk 2B inward to the disk mounting position (chucking position) shown in FIG. 28 while pushing the front peripheral portion of the small-diameter disk 2B.

Next, the centering operation and chucking operation of the disk 2 will be described below. As shown in FIGS. 20 and 28, after one of the large-diameter disk 2A and the small-diameter disk 2B having different diameters is conveyed to the disk mounting position by the first rotating arm 35 and the second rotating arm 36, the disk drive device 1 performs the centering operation for positioning the large-diameter disk 2A or the small-diameter disk 2B at the disk mounting position by holding the disk 2A or 2B with the first front contact member 38, the first rear contact member 39, the second front contact member 40, and the fourth contact member 50. More specifically, the center hole 2a of the large-diameter disk 2A or the small-diameter disk 2B and the engaging projection 28a of the turntable 23a are aligned with each other in the direction perpendicular to recording surface of the large-diameter disk 2A or the small-diameter disk 2B.

Next, after the centering operation of the large-diameter disk 2A or the small-diameter disk 2B, the disk drive device 1 performs the chucking operation for placing the large-diameter disk 2A or the small-diameter disk 2B positioned at the disk mounting position onto the turntable 23a of the disk mount 23 by causing the base-lifting mechanism 55 to move the moving the base plate 27 upward.

More specifically, when the base-lifting mechanism 55 moves the base plate 27 upward from the releasing position shown in FIG. 14 to the chucking position shown in FIG. 15, the engaging projection 28a enters the center hole 2a of the large-diameter disk 2A or the small-diameter disk 2B positioned at the disk mounting position. In addition, the peripheral portion around the center hole 2a of the large-diameter disk 2A or the small-diameter disk 2B is pushed against the contact projection 7 provided on the top plate 5a. Accordingly, the large-diameter disk 2A or the small-diameter disk 2B is placed on the turntable 23a such that the engaging projection 28a is engaged with the center hole 2a of the large-diameter disk 2A or the small-diameter disk 2B and the peripheral portion around the center hole 2a of the large-diameter disk 2A or the small-diameter disk 2B is retained by the retaining lugs 28b. Then, while the large-diameter disk 2A or the small-diameter disk 2B is placed on the turntable 23a, the base plate 27 is moved downward by the base-lifting mechanism 55 to the intermediate position shown in FIG. 16.

Figure 21:
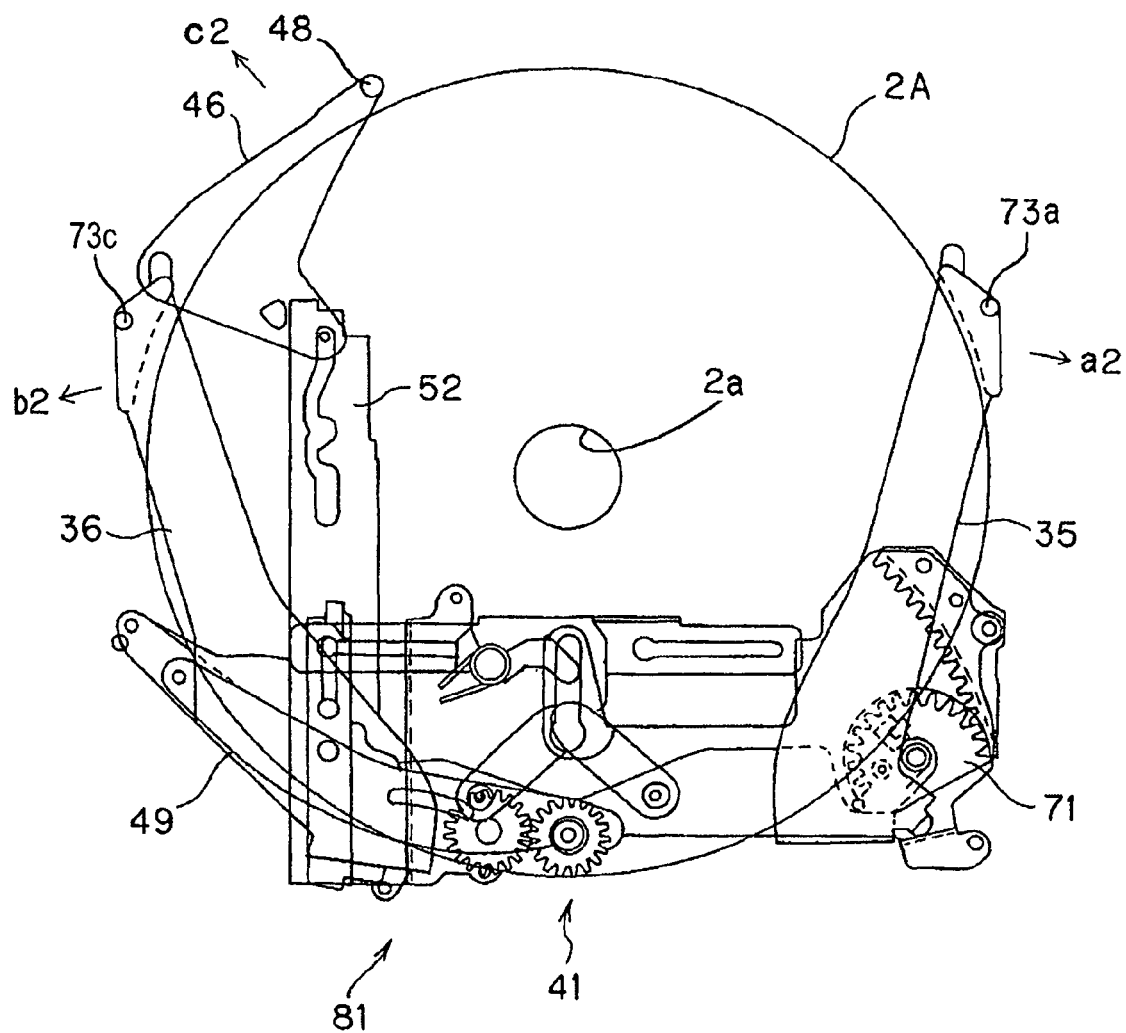
FIG. 21 is a plan view illustrating the state in which chucking of the large-diameter disk for recording and/or reproducing is completed (recording/reproducing is performed) in the operation of the disk drive device.
Figure 29:
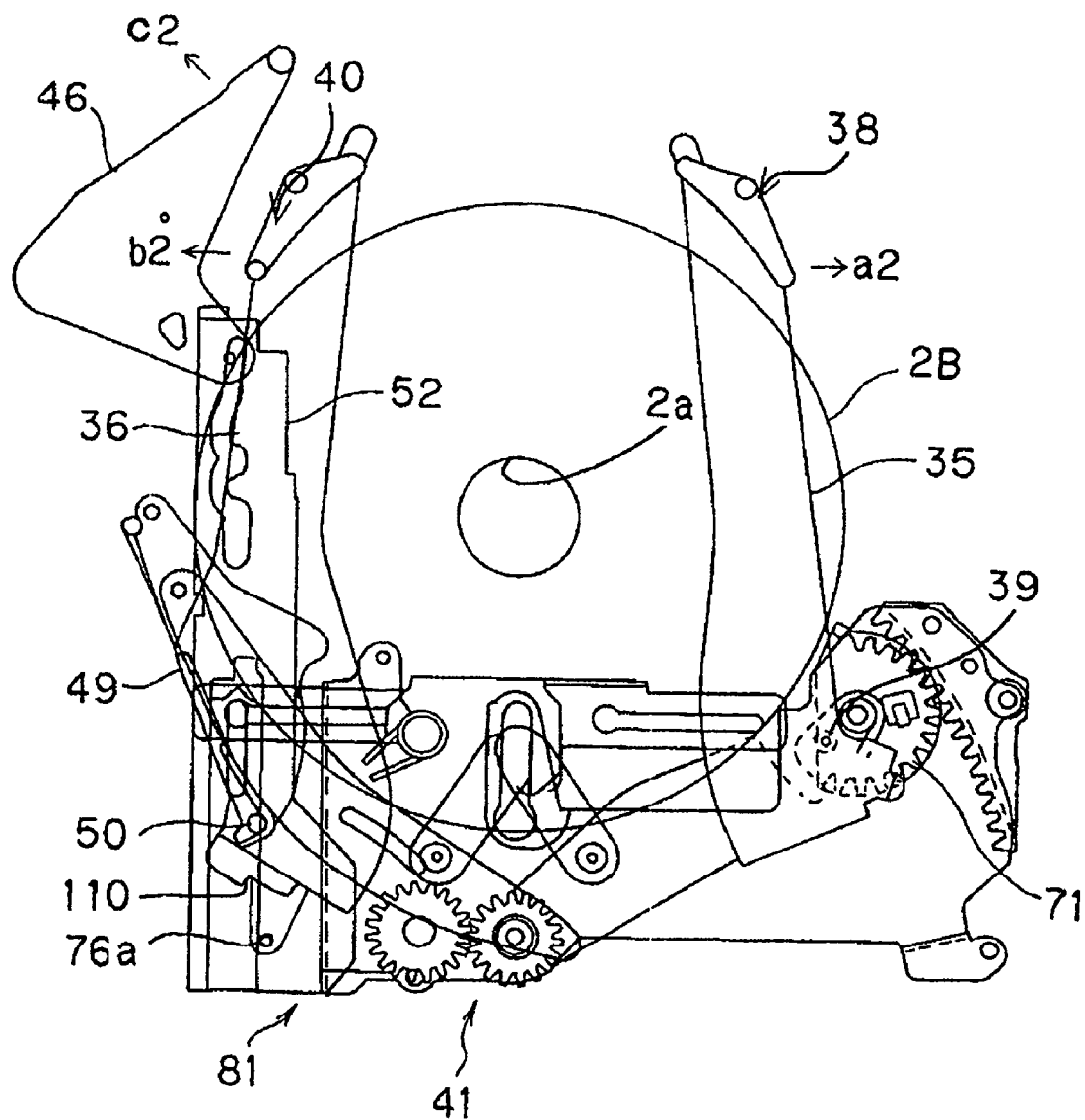
FIG. 29 is a plan view illustrating the state in which chucking of the small-diameter disk for recording and/or reproducing is completed in the operation of the disk drive device.

As shown in FIGS. 21 and 29, after the chucking operation, the disk drive device 1 is operated such that the first rotating arm 35 and the second rotating arm 36 are rotated away from each other, that is, in the directions shown by the arrows a2 and b2 in FIGS. 21 and 29, in association with the rearward sliding movement of the drive lever 52. At this time, the fourth rotating arm 49 is rotated together with the second rotating arm 36 while being in contact with the restricting tab (not shown). In addition, the third rotating arm 46 is slightly rotated in the direction shown by the arrow c2 in FIGS. 21 and 29 in association with the rearward movement of the drive lever 52.

Accordingly, the first front contact member 38, the first rear contact member 39, the second front contact member 40, the third contact member 48, and the fourth contact member 50 are separated from the outer peripheral portion of the large-diameter disk 2A or the small-diameter disk 2B placed on the turntable 23a.

In the disk drive device 1, when a recording or reproducing command is transmitted from the drive control circuit in the state shown in FIG. 21 or 29, signals are recorded on or reproduced from the large-diameter disk 2A or the small-diameter disk 2B on the basis of this command. More specifically, the spindle motor 24a rotates the large-diameter disk 2A or the small-diameter disk 2B together with the turntable 23a and the pickup-moving mechanism 26 moves the pickup mechanism 25 from the outer periphery toward the inner periphery. Then, under the focus servo control and the tracking servo control, TOC data recorded in a read-in area of the large-diameter disk 2A or the small-diameter disk 2B is read out. Then, when the signals are recorded, the pickup mechanism 25 is moved to a designated address in a program area of the large-diameter disk 2A or the small-diameter disk 2B on the basis of the obtained TOC data. When the signals are reproduced, the pickup mechanism 25 is moved to an address in the program area at which the designated data is recorded. Then, the pickup mechanism 25 performs an operation of writing or reading signals on the large-diameter disk 2A or the small-diameter disk 2B at a desired recording track.

Next, the releasing operation and the conveying operation performed when the disk 2 is ejected will be described below. In the disk drive device 1, when the eject button 21 provided on the display element 20 is pressed or an eject command is transmitted to the disk drive device 1 from a personal computer, first, the drive mechanism starts sliding the drive lever 52 frontward.

Then, as shown in FIGS. 20 and 28, the first rotating arm 35 and the second rotating arm 36 are slightly rotated toward each other, that is, in the directions shown by the arrows a1 and b1 in FIGS. 20 and 28, in association with the frontward sliding movement of the drive lever 52. At this time, the fourth rotating arm 49 is rotated together with the second rotating arm 36 while being in contact with the restricting tab.

Accordingly, the first front contact member 38, the first rear contact member 39, the second front contact member 40, and the fourth contact member 50 come into contact with the outer peripheral portion of the large-diameter disk 2A or the small-diameter disk 2B placed on the turntable 23a.

Next, the disk drive device 1 performs a releasing operation for separating the large-diameter disk 2A or the small-diameter disk 2B from the turntable 23a of the disk-mount 23 by causing the base-lifting mechanism 55 to move the base plate 27 downward to the releasing position.

More specifically, when the base plate 27 is moved downward to the releasing position, the end portion of the push-up pin 66 comes into contact with the large-diameter disk 2A or the small-diameter disk 2B placed on the turntable 23a at an inner peripheral region outside the signal-recording region. Accordingly, the large-diameter disk 2A or the small-diameter disk 2B is pushed upward and released from the turntable 23a.

Next, the disk drive device 1 performs the eject operation for ejecting the large-diameter disk 2A or the small-diameter disk 2B on the disk mount 23 from the housing 3 through the slot 19.

Figure 22:
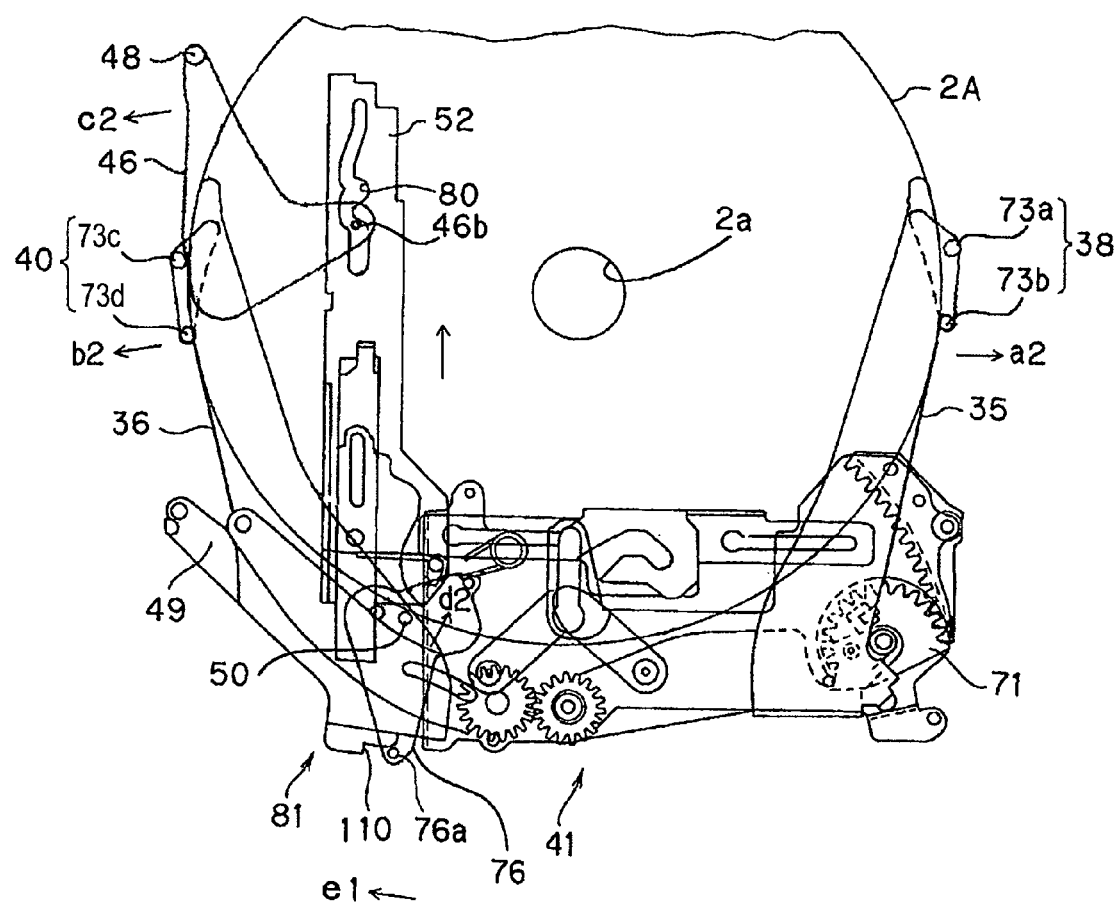
FIG. 22 is a plan view illustrating the state in which the large-diameter disk is being ejected in the operation of the disk drive device.

When the large-diameter disk 2A is ejected from the housing 3 through the slot 19, first, as shown in FIG. 22, the fourth rotating arm 49 is rotated in the direction shown by the arrow d2 in FIG. 22 in association with the frontward sliding movement of the drive lever 52. Since the fourth contact member 50 of the fourth rotating arm 49 comes into contact with the rear peripheral portion of the large-diameter disk 2A, the fourth rotating arm 49 pushes the rear peripheral portion of the large-diameter disk 2A to eject the large-diameter disk 2A from the housing 3.

Figure 23:
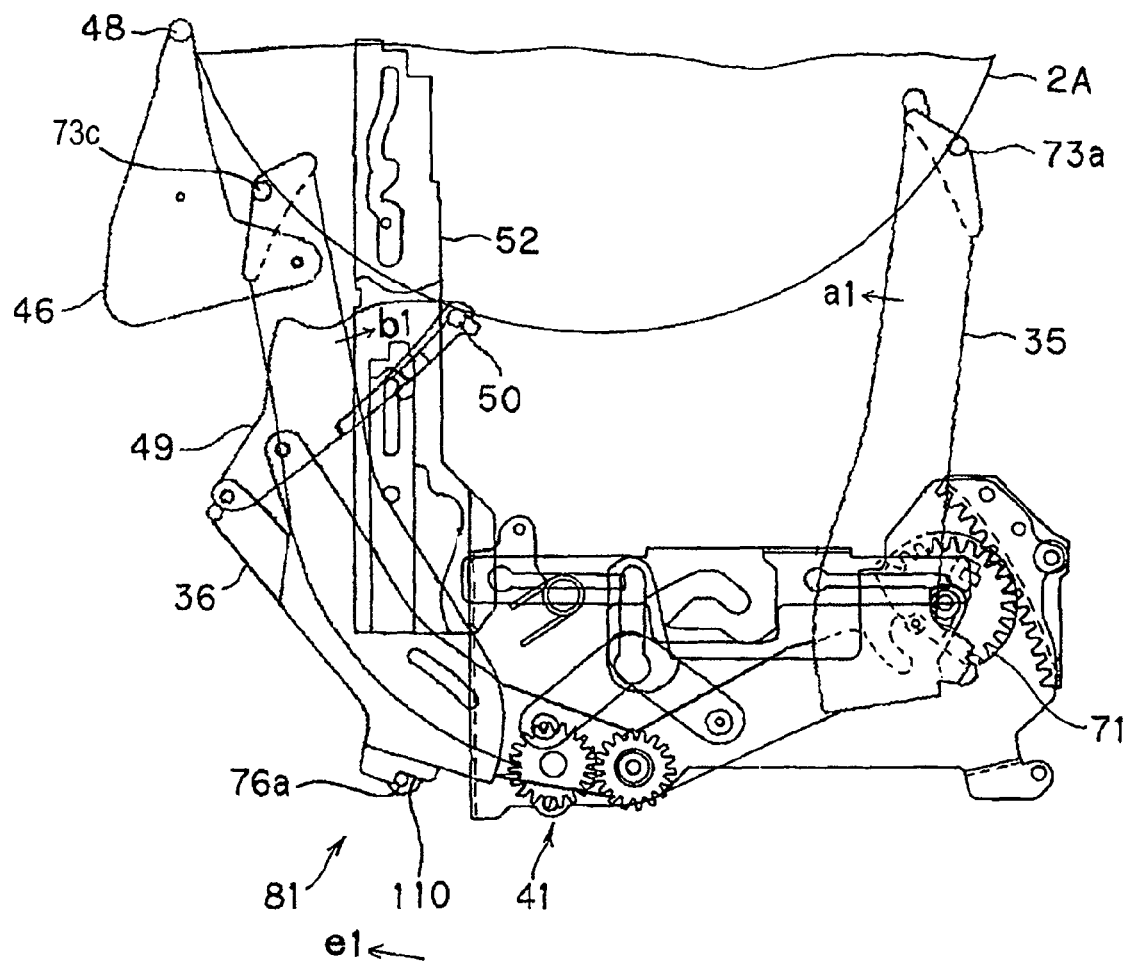
FIG. 23 is a plan view illustrating the state in which a contact pin is engaged with a stopper when the large-diameter disk is ejected in the operation of the disk drive device.

Then, when the large-diameter disk 2A is further moved toward the outside of the housing 3 and reaches a position where the center hole 2a of the large-diameter disk 2A is closer to the front side than the line connecting the first front contact member 38 and the second front contact member 40, as shown in FIG. 23, the first front contact member 38 and the second front contact member 40 move to the rear peripheral portion of the large-diameter disk 2A from the front peripheral portion thereof. Accordingly, the first rotating arm 35 and the second rotating arm 36 are rotated toward each other, that is, in the directions shown by the arrows a1 and b1 in FIG. 23, by the urging forces applied by the torsion coil spring 71d and the second torsion coil spring 77 while the first front contact member 38 and the second front contact member 40 are in contact with the rear peripheral portion of the large-diameter disk 2A.

When the first rotating arm 35 and the second rotating arm 36 move toward each other while the large-diameter disk 2A is being ejected, the contact pin 76a of the pushing lever 76 moves from the position shown in FIG. 22 in the direction shown by the arrow e1 and becomes engaged with the step portion of the stopper 110, as shown in FIG. 23. Accordingly, the pushing force applied to the stopper 110 from the contact pin 76a is not transmitted and a torque that tries to move the first rotating arm 35 and the second rotating arm 36 toward each other is considerably reduced compared to the case in which the stopper 110 is not provided.

The force by which the first rotating arm 35 and the second rotating arm 36 try to push the large-diameter disk 2A outward is sufficiently weaker than the frictional force between the large-diameter disk 2A and the curtain 32. Accordingly, the first rotating arm 35 and the second rotating arm 36 push the rear peripheral portion of the large-diameter disk 2A to convey the large-diameter disk 2A to the disk insertion/ejection position, that is, the position at which the center hole 2a of the large-diameter disk 2A is exposed to the outside of the housing 3 through the slot 19.

When the user removes the large-diameter disk 2A from the slot 19, the force that restricts the rotation of the first rotating arm 35 and the second rotating arm 36 is eliminated. Accordingly, the first rotating arm 35 and the second rotating arm 36 are moved toward each other to the HOME positions thereof by the urging force applied by the torsion coil spring 71d and second torsion coil spring 77. Thus, the eject operation is completed.

Figure 30:
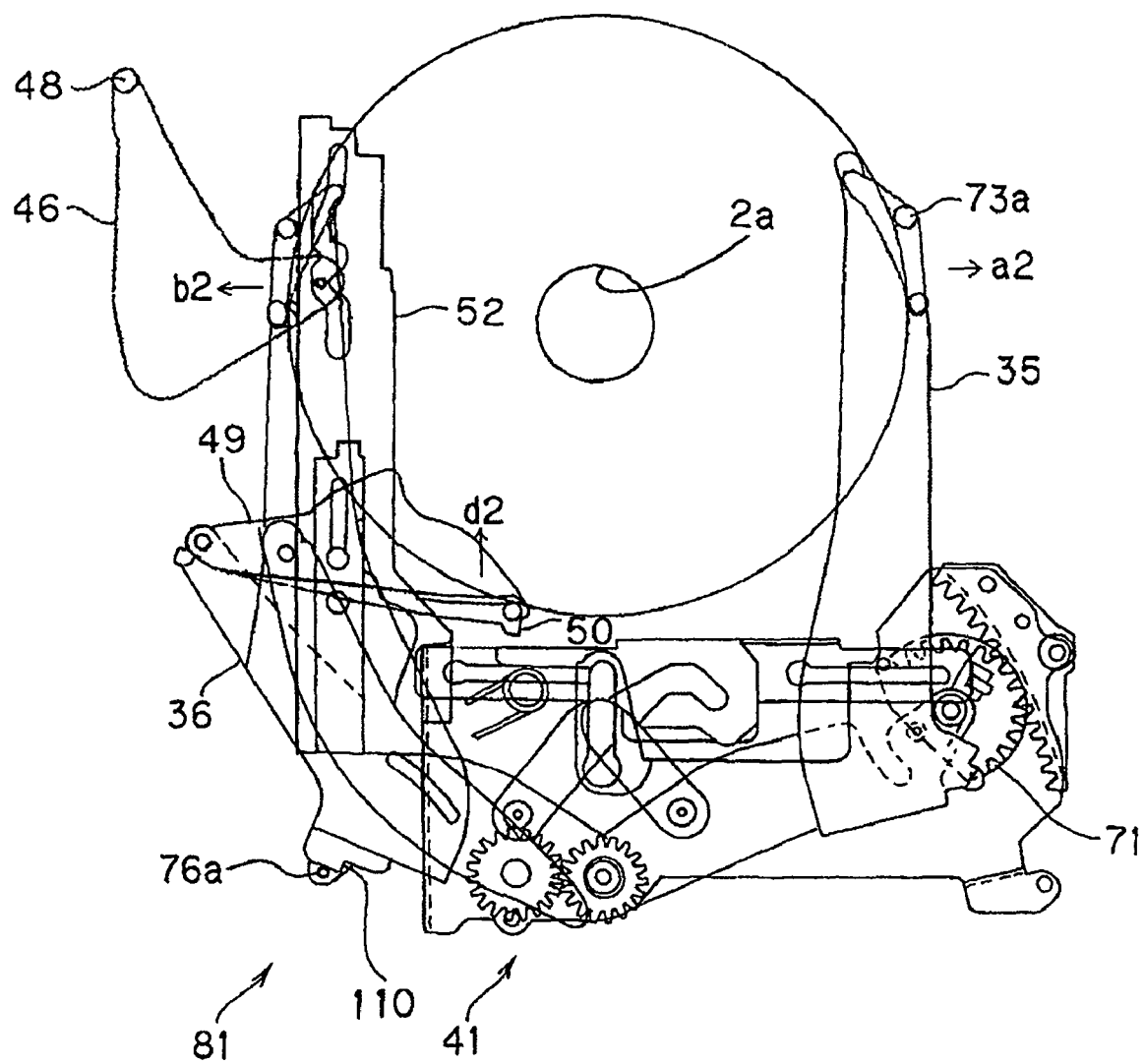
FIG. 30 is a plan view illustrating the state in which the small-diameter disk is being ejected in the operation of the disk drive device.

When the small-diameter disk 2B is ejected from the housing 3 through the slot 19, first, as shown in FIG. 30, the fourth rotating arm 49 is rotated in the direction shown by the arrow d2 in FIG. 28 in association with the frontward movement of the drive lever 52. Since the fourth contact member 50 of the fourth rotating arm 49 is in contact with the rear peripheral portion of the small-diameter disk 2B, the fourth rotating arm 49 pushes the rear peripheral portion of the small-diameter disk 2B to eject the small-diameter disk 2B from the housing 3.

Then, when the small-diameter disk 2B is further moved toward the outside of the housing 3 and reaches a position where the center hole 2a of the small-diameter disk 2B is closer to the front side than the line connecting the first front contact member 38 and the second front contact member 40, as shown in FIG. 25, the first front contact member 38 and the second front contact member 40 move to the rear peripheral portion of the small-diameter disk 2B from the front peripheral portion thereof. Accordingly, the first rotating arm 35 and the second rotating arm 36 are rotated toward each other, that is, in the directions shown by the arrows a1 and b1 in FIG. 25, by the urging forces applied by the torsion coil spring 71d and the second torsion coil spring 77 while the first front contact member 38 and the second front contact member 40 are in contact with the rear peripheral portion of the small-diameter disk 2B.

Accordingly, the first rotating arm 35 and the second rotating arm 36 push the rear peripheral portion of the small-diameter disk 2B until the small-diameter disk 2B reaches the disk insertion/ejection position. Similar to the large-diameter disk 2A, the disk insertion/ejection position of the small-diameter disk 2B is set to a position where the center hole 2a of the small-diameter disk 2B is placed outside the slot 19.

Although the curtain 32 is used to apply the frictional load to the large-diameter disk 2A or the small-diameter disk 2B, other friction members may also be provided at a position near the slot 19.

As described above, the disk-conveying mechanism 34 included in the disk drive device 1 according to the present embodiment has the restricting mechanism 120 that restricts the movement of the arm mechanism 135. Therefore, the movement of the arm mechanism 135 can be restricted when, for example, the large-diameter disk 2A is ejected through the slot 19, and accordingly the pushing force applied to the large-diameter disk 2A by the arm mechanism 135 can be adjusted (reduced). Thus, the distance by which the large-diameter disk 2A is pushed out from the slot 19 can be adjusted. When, for example, the distance by which the large-diameter disk 2A is pushed out from the slot 19 is set to substantially one-half of the diameter of the large-diameter disk 2A, the large-diameter disk 2A can be easily removed from the slot 19 and the large-diameter disk 2A can be prevented from falling from the slot 19. In particular, if the adjustment is such that the eject operation is finished when the center hole 2a of the large-diameter disk 2A or the small-diameter disk 2B is completely out of the slot 19, the user can easily remove the large-diameter disk 2A or the small-diameter disk 2B from the slot 19.

The arm mechanism 135 includes the first rotating arm 35 and the second rotating arm 36 provided such that the first rotating arm 35 and the second rotating arm 36 can rotate so as to hold the large-diameter disk 2A at the peripheral portion thereof and the pushing lever 76 that pushes the first rotating arm 35 and the second rotating arm 36 toward each other. In addition, the restraining mechanism 120 includes the stopper 110 that engages with the pushing lever 76 when the large-diameter disk 2A is ejected. Therefore, when the pushing lever 76 engages with the stopper 110 in the process of ejecting the large-diameter disk 2A, the pushing force applied to the large-diameter disk 2A by the second rotating arm 36 that is pushed by the pushing lever 76 is reduced. Thus, the distance by which the large-diameter disk 2A is pushed out from the slot 19 can be adjusted.

In addition, the pushing force applied to the large-diameter disk 2A by the arm mechanism 135 when the movement of the arm mechanism 135 is restricted by the restraining mechanism 120 is smaller than the frictional force applied to the large-diameter disk 2A from the slot 19 (from the curtain 32 on the slot 19). Accordingly, when the movement of the arm mechanism 135 is restricted by the restraining mechanism 120, the large-diameter disk 2A that is being ejected can be held in the slot 19 by the frictional force applied between the slot 19 (the curtain 32 on the slot 19) and the large-diameter disk 2A.

In addition, when the large-diameter disk 2A is pulled out from the slot 19, the pushing lever 76 pushes the first rotating arm 35 and the second rotating arm 36 such that the pushing lever 76 is released from the stopper 110. Accordingly, when the large-diameter disk 2A is pulled out from the slot 19, the frictional force between the slot 19 (the curtain 32 on the slot 19) and the large-diameter disk 2A is eliminated and the pushing lever 76 becomes disengaged from the stopper 110. Therefore, the first rotating arm 35 and the second rotating arm 36 can be returned to, for example, the HOME state without using a mechanism for canceling the engagement.

Figure 32A:
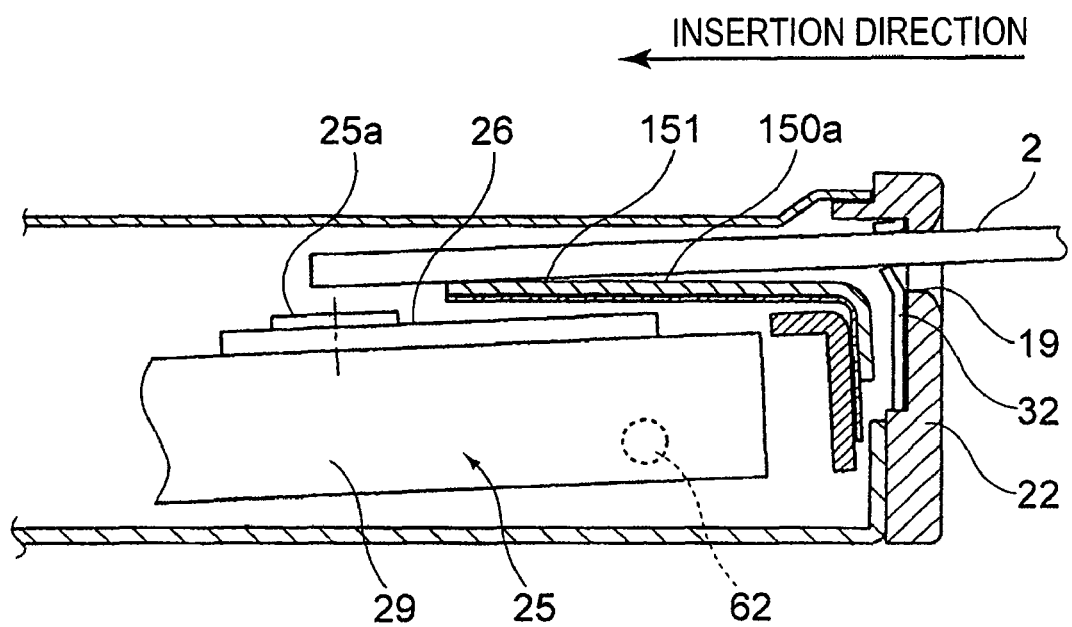
FIGS. 32A and 32B are enlarged views showing parts of FIGS. 31A and 31B, respectively.
Figure 32B:
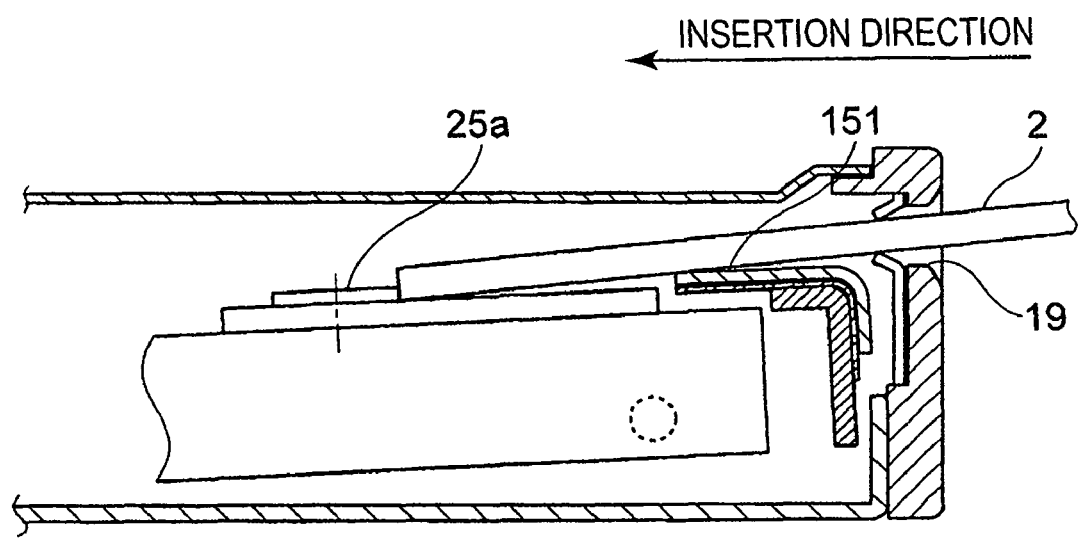

Next, the behavior of the disk 2 in a region near the slot 19 when the disk 2 is inserted will be described below. FIGS. 31A and 31B and FIGS. 32A and 32B are sectional views illustrating the manners in which the disk 2 is inserted though the slot 19 in the disk drive device according to the embodiment of the present invention and a known disk drive device. FIGS. 31A and 32A are schematic sectional views illustrating the disk drive device 1 according to the present embodiment when the disk 2 is inserted, and FIGS. 31B and 32B are schematic sectional views illustrating the known disk drive device when the disk 2 is inserted.

As shown in FIGS. 31B and 32B, in the known disk drive device, unlike the present embodiment, the protruding surface 150a is not formed although the sheet member 151 is adhered to the pickup unit 22. Accordingly, when the disk 2 is inserted, there is a risk that the disk 2 will come into contact with the objective lens 25a of the pickup mechanism 25 or other components. In such a case, the disk 2 or the objective lens 25a will be damaged and it becomes difficult to perform the recording/reproducing operation with high reliability.

In comparison, according to the present embodiment, as shown in FIGS. 31A and 32A, the disk 2 is guided by the protruding surface 150a so as to move above the pickup mechanism 25 toward the flange 138 of the rotating arm 35 even when the disk 2 is inserted through the slot 19 in the inclined manner. More specifically, since the protruding surface 150a is provided, the disk 2 does not come into contact with the objective lens 25a of the pickup mechanism 25 even when the disk 2 is inserted in the inclined manner. Accordingly, the disk 2 and the lens 25a are prevented from being damaged. In addition, since the sheet member 151 is adhered to the protruding surface 150a, the disk 2 is prevented from being damaged even if the disk 2 comes into contact with the protruding surface 150a when the disk 2 is ejected.

Figure 33:
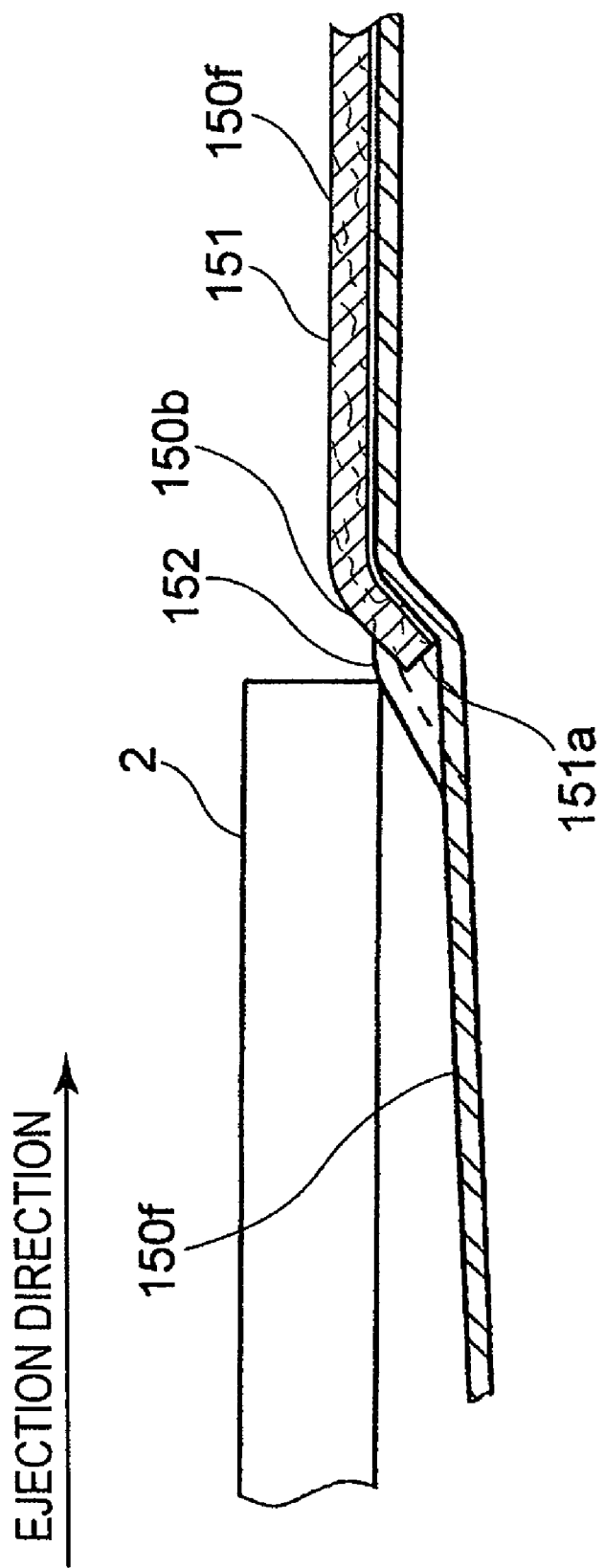
FIG. 33 is a schematic sectional side view illustrating a region around a projecting surface when the disk is ejected.
Figure 34A:
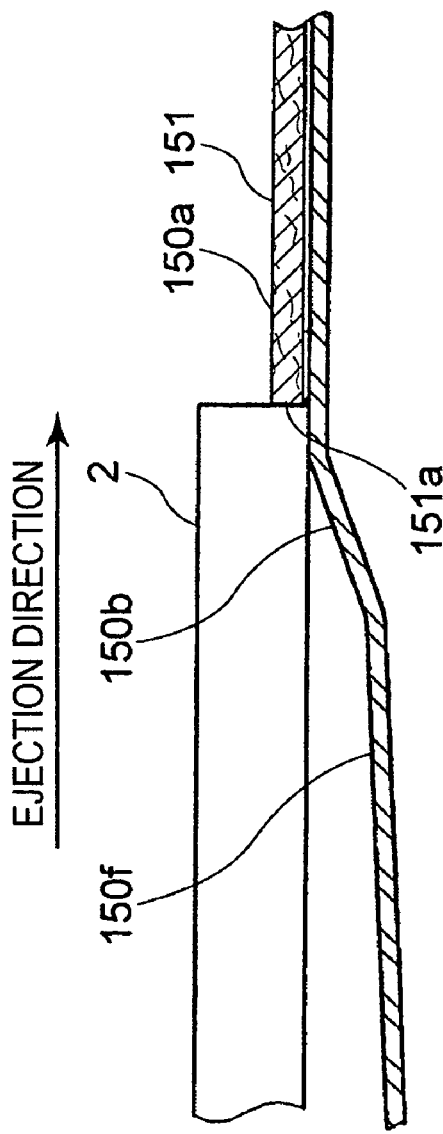
FIGS. 34A and 34B are sectional side views illustrating examples of manners in which a sheet member, which impedes the ejection of the disk, is adhered.
Figure 34B:
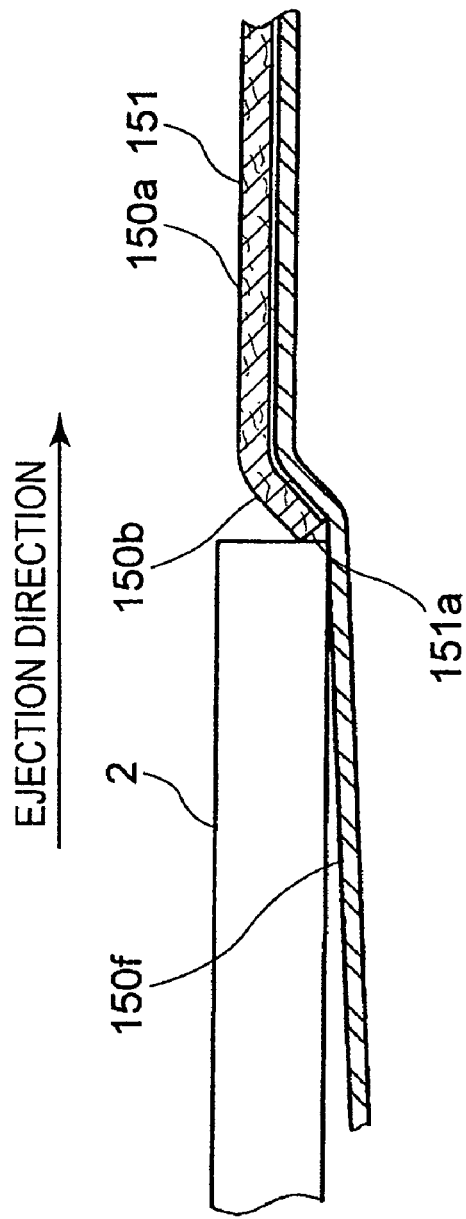

Next, the behavior of the disk 2 in a region near the slot 19 when the disk 2 is ejected will be described below. FIG. 33 is a schematic sectional side view illustrating a region around the projecting surface 150a when the disk 2 is ejected. FIGS. 34A and 34B are sectional side views illustrating examples of manners in which the sheet member 151, which impedes the ejection of the disk 2, is adhered.

As shown in FIGS. 34A and 34B, if an end face 151a of the sheet member 151 is exposed in a region between the projecting surface 150a and the inclined surface 150b, there is a risk that the peripheral portion of the disk 2 collides with the end face 151a and the disk 2 will be caught by the end face 151a. In such a case, it becomes difficult to eject the disk 2 any further.

In comparison, as shown in FIG. 33, according to the present embodiment, when the disk 2 released from the chucking position is caused to approach the protruding surface 150a in the ejection operation of the first and the second rotating arms 35 and 36, first, the disk 2 comes into contact with the projections 152 provided on the inclined surface 150b. Then, the disk 2 is guided by the projections 152 and moves over the inclined surface 150b without coming into contact with the end face 151a of the sheet member 151. In other words, since the projections 152 are provided, the disk 2 smoothly moves onto the surface of the sheet member 151 without being caught by the end face 151a of the sheet member 151, and is ejected through the slot 19. Accordingly, the disk ejection operation can be performed with high reliability.

The present invention is not limited to the above-described embodiment, and various modifications are possible within the scope of the present invention.

Figure 35:
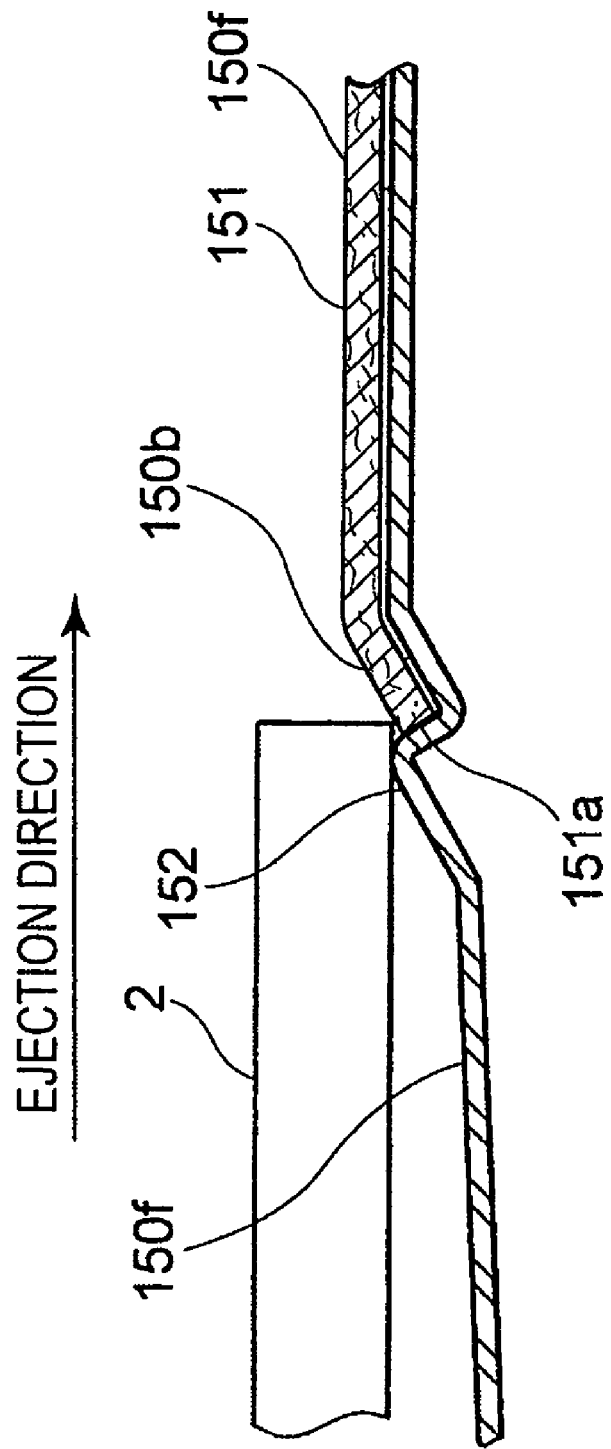
FIG. 35 is a diagram showing a projection according to another embodiment of the present invention.

In the above-described embodiment, a plurality of projections 152 are provided independently of the cover plate 150 so as to extend from the cover plate surface 150f to the inclined surface 150b. However, as shown in FIG. 35, a projection 152 may be formed integrally with the cover plate 150 in an N-shape (Z-shape) along the inclined surface 150b, and the end face 151a of the sheet member 151 may be placed in a recess provided between the projection 152 and the inclined surface 150b. Also in this case, the disk 2 is guided onto the surface of the sheet member 151 without causing the disk 2 to be caught by the end face 151a of the sheet member 151.

In addition, as shown in FIG. 36, a slit 150i may be formed in the cover plate 150 and the sheet member 151 may be adhered in such a manner that the sheet member 151 extends through the slit 150i and is folded onto the bottom surface of the base plate 150. Accordingly, the end face 151a of the sheet member 151 is not exposed. This structure and the guiding effect obtained by the above-described projections 152 allow the disk 2 to be more reliably prevented from being caught.

In the above-described embodiment, the sheet member 151 is adhered to the protruding surface 150a. However, instead of adhering the sheet member 151, the overall region of the protruding surface 150a may be coated with resin, such as urethane, that does not easily damage the recording surface of the disk 2. In addition, not only the protruding surface 150a but the entire area of the cover plate 150 may be coated.

In the above-described embodiment, the rotating arms are used in the disk-conveying mechanism. However, other structures, for example, a pair of guide rollers, may also be used.

The disk drive device 1 according to the above-described may be used in personal computers (PC), audio/visual (AV) apparatuses, in-vehicle apparatuses, etc., or be formed as a stand alone device.

It should be understood by those skilled in the art that various modifications, combinations, sub-combinations and alterations may occur depending on design requirements and other factors insofar as they are within the scope of the appended claims or the equivalents thereof.

What is claimed is:

1. A disk drive device comprising:
    a housing having a front side that has a slot through which a disk-shaped recording medium is inserted and ejected;
    a pickup unit including a mount on which the disk recording medium is mounted, a rotating mechanism that rotates the disk recording medium mounted on the mount, a pickup mechanism capable of reproducing a signal recorded on the recording medium, a pickup-moving mechanism that moves the pickup mechanism in a radial direction of the recording medium, and a base plate that has a protruding surface guiding the disk recording medium toward the mount and on which the mount, the rotating mechanism, the pickup mechanism, and the pickup-moving mechanism are integrated; and
    a conveying mechanism that conveys the recording medium between the slot and the mount.

2. The disk drive device according to claim 1, wherein the protruding surface is integrated on the base plate.

3. The disk drive device according to claim 1, wherein the pickup unit further includes a sheet member that is adhered so as to cover the protruding surface and is composed of fiber or leather.

4. The disk drive device according to claim 3, wherein the base plate has a projection that guides the recording medium onto a surface of the sheet member when the recording medium is ejected.

5. The disk drive device according to claim 4, wherein the sheet member has an end face that faces a direction in which the recording medium is inserted, and wherein the projection is provided so as to cover the end face.

6. The disk drive device according to claim 4, wherein the base plate has a slit at a position closer to the slot than the projection, and wherein the sheet member extends through the slit and is folded onto a bottom surface of the base plate.

7. The disk drive device according to claim 1, wherein the protruding surface has a drawn portion.

8. The disk drive device according to claim 1, wherein the protruding surface is coated with resin.

9. The disk drive device according to claim 1, wherein the disk drive device is capable of receiving a first disk and a second disk as the recording medium, the first disk having a first diameter and the second disk having a second diameter that is different from the first diameter.

10. The disk drive device according to claim 1, wherein the protruding surface is arranged such that the protruding surface covers a part of the pickup mechanism when the pickup mechanism is moved to a position adjacent to the slot by the pickup-moving mechanism.

11. The disk drive device according to claim 1, wherein the protruding surface is located adjacent to the slot in the pickup unit.

12. An electronic apparatus comprising:

a disk drive device including a housing having a front side that has a slot through which a disk-shaped recording medium is inserted and ejected, a pickup unit including a mount on which the disk recording medium is mounted, a rotating mechanism that rotates the disk recording medium mounted on the mount, a pickup mechanism capable of reproducing a signal recorded on the recording medium, a pickup-moving mechanism that moves the pickup mechanism in a radial direction of the recording medium, and a base plate that has a protruding surface guiding the disk recording medium toward the mount and on which the mount, the rotating mechanism, the pickup mechanism, and the pickup-moving mechanism are integrated, and a conveying mechanism that conveys the recording medium between the slot and the mount; and a control unit for controlling the operation of the disk drive device.

\* \* \* \* \*